United States Patent
Kaneko et al.

(10) Patent No.: US 6,853,437 B1
(45) Date of Patent: Feb. 8, 2005

(54) LIQUID CRYSTAL DISPLAY AND METHOD FOR MANUFACTURING THE SAME

(75) Inventors: Yasushi Kaneko, Tokorozawa (JP); Hiroshi Tsukada, Tanashi (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/530,008

(22) PCT Filed: Aug. 25, 1999

(86) PCT No.: PCT/JP99/04590

§ 371 (c)(1), (2), (4) Date: Apr. 24, 2000

(87) PCT Pub. No.: WO00/11516

PCT Pub. Date: Mar. 2, 2000

(30) Foreign Application Priority Data

Aug. 25, 1998 (JP) .......................................... 10-238579

(51) Int. Cl.⁷ .................... G02F 1/1347; G02F 1/1333; G02F 1/1335; G02F 1/13
(52) U.S. Cl. .......................... 349/194; 349/74; 349/96; 349/117
(58) Field of Search ............................ 349/74, 96, 117, 349/194, 77

(56) References Cited

U.S. PATENT DOCUMENTS

| 5,136,405 | A |   | 8/1992 | Wada et al. | .................... 359/53 |
| 5,793,455 | A | * | 8/1998 | Nakamura | .................... 349/96 |
| 5,855,971 | A | * | 1/1999 | Kobori et al. | .............. 349/118 |
| 6,437,843 | B1 | * | 8/2002 | Van De Witte et al. | .... 349/117 |

FOREIGN PATENT DOCUMENTS

| EP | 0 527 231 | | 2/1993 |
| JP | 03294821 | * | 4/1990 |
| JP | 3-294821 | | 12/1991 |
| JP | 6-3661 | | 1/1994 |
| JP | 6-289221 | | 10/1994 |
| WO | 97/23805 | | 7/1997 |

* cited by examiner

Primary Examiner—Tarifur R. Chowdhury
Assistant Examiner—Hoan C. Nguyen
(74) Attorney, Agent, or Firm—Finnegan, Henderson, Farabow, Garrett & Dunner, L.L.P.

(57) ABSTRACT

The liquid crystal display apparatus according to the present invention includes a) the direction of the twist angle of molecule orientation of the twisted phase difference board (3) is reverse to the direction of the twisted orientation of the liquid crystal molecule of the liquid crystal devices (2), and the twist angle of the twisted phase difference board is smaller than the twist angle of the liquid crystal devices (2) by 10° to 40°; b) an angle between the liquid crystal molecule-oriented direction of the alignment film (23a) of the second substrate and the molecule-oriented direction of a lower polymer (32b) of the liquid crystal polymer layer lies in the range of 80° to 90°; c) an angle between an absorption axis of the first polarization board (1) and the liquid crystal molecule-oriented direction of the alignment film (23b) of the first substrate side lies in the range of 50° to 60°; d) an angle between the absorption axis of the second polarization board (4) and the molecule-oriented direction of an upper polymer (32a) of the liquid crystal polymer lies in the range of 30° to 40°; and e) the relationship between Δnd1 of the nematic liquid crystal layer and Δnd2 of the liquid crystal polymer layer is defined in a particular relationship, so that it is possible to resolve colored image on the display and to realize an image quality having a high contrast.

13 Claims, 29 Drawing Sheets

Fig.2

| EXPERIMENT NUMBER | | 1 | 2 | 3 | 4 | 5 | 6 | 7 |
|---|---|---|---|---|---|---|---|---|
| UPPER (SECOND) POLARIZATION BOARD | | +35°~ +75° | +35°~ +75° | +35°~ +75° | +35°~ +75° | +50° | +50° | +40° |
| TWISTED PHASE DIFFER-ENCE BOARD | UPPER POLYMER MOLECULE | −70° | −80° | −80° | −80° | −80° | −80° | −100° |
| | LOWER POLYMER MOLECULE | +70° | +60° | +60° | +60° | +60° | +60° | +60° |
| LIQUID CRYSTAL CELL | UPPER LIQUID CRYSTAL MOLECULE | −30° | −30° | −30° | −30° | −30° | −30° | −30° |
| | LOWER LIQUID CRYSTAL MOLECULE | +30° | +30° | +30° | +30° | +30° | +30° | +30° |
| LOWER (FIRST) POLARIZATION BOARD | | −15° | −15° | −15° | −15° | −5°~ −25° | −10° | −15° |

Fig.3

| EXPERIMENT NUMBER | | FINAL 1 | FINAL 2 | FINAL 3 |
|---|---|---|---|---|
| UPPER (SECOND) POLARIZATION BOARD | | +45° | −45° | +90° |
| TWISTED PHASE DIFFER-ENCE BOARD | UPPER POLYMER MOLECULE | −85° | −85° | +50° |
| | LOWER POLYMER MOLECULE | +55° | +55° | +10° |
| LIQUID CRYSTAL CELL | UPPER LIQUID CRYSTAL MOLECULE | −30° | −30° | −75° |
| | LOWER LIQUID CRYSTAL MOLECULE | +30° | +30° | −15° |
| LOWER (FIRST) POLARIZATION BOARD | | −5° | +85° | +40° |

Fig.22

|  | TWISTED PHASE DIFFERENCE 220° | TWISTED PHASE DIFFERENCE 200° | PHASE DIFFERENCE BOARD | REMARK |
|---|---|---|---|---|
| WHITE-Y (x, y) | 0.259 NORMAL (0.338, 0.377) | 0.260 NORMAL (0.346, 0.387) | 0.260 LIGHT GREEN (0.33, 0.366) | 0 (v) |
| HALF TONE (x, y) | GRAY (0.329, 0.351) | GRAY (0.333, 0.351) | BROWN (0.384, 0.417) | 2.05 (v) |
| BLACK-Y (x, y) | 0.0187 BLUE-BLACK (0.22, 0.194) | 0.007 BLACK (0.323, 0.165) | 0.021 BLUE-BLACK (0.245, 0.194) | 2.15 (v) |
| CONTRAST | 13 | 35 | 11 | 1.95/2.15 |

UPPER POLARIZATION FILM & POLYMER FILM ARE SUPERPOSED ON EACH OTHER

UPPER POLARIZATION FILM & UPPER POLYMER FILM ARE SUPERPOSED ON EACH OTHER

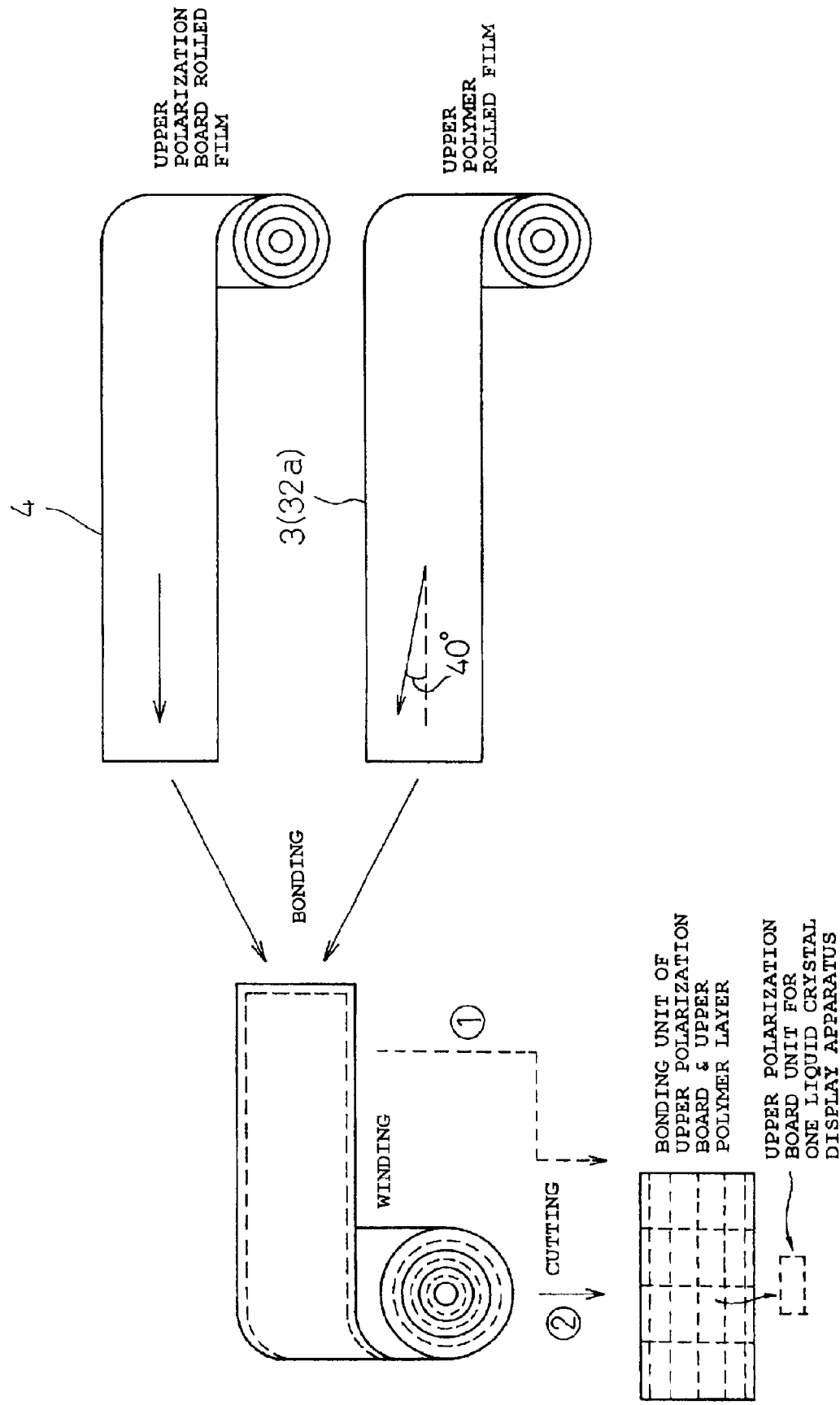

LIQUID CRYSTAL DISPLAY AND METHOD FOR MANUFACTURING THE SAME

TECHNICAL FIELD

The present invention relates to a liquid crystal display apparatus and a method for manufacturing the same. In particular, it relates to a liquid crystal display apparatus and a method for manufacturing the same which defines an optimum arrangement of STN-type liquid crystal devices and structural components each connected to the liquid crystal devices, in order to realize a high quality image. The present invention can be advantageously applied to a liquid crystal display unit used in a portable terminal, a game apparatus used as a toy, etc.

BACKGROUND ART

For example, an STN-type liquid crystal apparatus has been disclosed in Japanese Unexamined Patent Publication No. 7-191296 (published date: Jul. 28, 1995, "A liquid crystal apparatus"). This liquid apparatus includes a display cell holding a nematic liquid crystal layer between a first substrate having a first transparent electrode and a second substrate having a second transparent electrode, and an optical anisotropic member for correcting a phase difference structured using a polymer film or a compensating liquid crystal cell between a second polarization board and the second substrate which are provided between a first polarization board and the second polarization board.

According to this document, the nematic liquid crystal layer of the display cell (corresponding to the liquid crystal devices) is twisted and oriented by 120° or more, and a twist angle and a retardation $\Delta nd$ of the optical anisotropic body are set to predetermined conditions in accordance with the twist angle of the nematic liquid crystal layer and the retardation $\Delta nd$ which is obtained by a product of a double refractive index $\Delta n$ and a gap "d" between substrates, so that undesirable color on the display, occurring during a turned on/off state of the liquid crystal devices, can be resolved.

In this document, however, since the twist angle and the retardation $\Delta nd$ of the optical anisotropic member (corresponding to the twisted phase difference board) are set in accordance with the twist angle and the retardation $\Delta nd$ of the nematic liquid crystal layer, the following items (1) to (6) have not yet defined concretely. That is, (1) a relationship of an angle between a direction of the twist angle of the twisted phase difference board and the direction of the twist angle of the liquid crystal device; (2) the relationship of the angle between an oriented direction of the liquid crystal molecule of an alignment film of the second substrate and a molecule-oriented direction of a lower polymer of the twisted phase difference board; (3) the relationship of the angle between an absorption axis of the first polarization board and the oriented direction of the liquid crystal molecule of the alignment film of the first substrate; (4) the relationship of an angle between an absorption axis of the second polarization board and the oriented direction of the molecule of an upper polymer of the twisted phase difference board; (5) the relationship between the double refractive index of the nematic liquid crystal layer and the double refractive index of the twisted phase difference board; and (6) preferential view angles at the liquid crystal layer of the liquid crystal device. Accordingly, in this document, an optimum display quality has not yet been realized for resolving undesirable color on the display occurring during the turned on/off state of the liquid crystal device.

DISCLOSURE OF THE INVENTION

The purpose of the present invention is to provide a liquid crystal display apparatus which can resolve undesirable color on the display and can realize bright and high contrast image quality, based on data obtained through various experiments, by defining concretely the relationship of each angle described in the above items (1) to (6).

Another purpose of the present invention is to provide a method for manufacturing the above liquid crystal display apparatus which can effectively determine a cutting size of a material (below, material-cutting) for the structural component based on the structure of the above liquid crystal display apparatus so that it is possible to considerably reduce the manufacturing cost and to improve the productivity when manufacturing the liquid crystal display apparatus.

According to the first aspect of the present invention, in the liquid crystal display apparatus comprising a first substrate having a first transparent electrode and a second substrate having a second transparent electrode; liquid crystal devices holding the nematic liquid crystal layer which is twisted and oriented by the twist angle of the STN (preferably, in the range of 180° to 270°) between the first and second substrates; the first polarization board which is provided for an outside of the first substrate; the twisted phase difference board having the liquid crystal polymer layer and provided for the outside of the second substrate; and the second polarization board provided for the outside of the twisted phase difference board.

The twisted direction of the twist angle of the molecule orientation of the twisted phase difference board is reverse to the direction of the twisted orientation of the liquid crystal molecule of the liquid crystal devices, and the twist angle of the twisted phase difference board is structured with an angle smaller than the twist angle of the liquid crystal device by 10° to 40°.

Preferably, an angle between the oriented direction of the liquid crystal molecule of the alignment film of the second substrate and the molecule-oriented direction of the lower polymer of the liquid crystal polymer layer lies in the range of 80° to 90°, and the angle between the absorption axis of the first polarization board and the molecule-oriented direction of the alignment film of the first substrate lies in the range of 50° to 60°, and further the angle between the absorption axis of the second polarization board and the molecule-oriented direction of the upper polymer of the liquid crystal polymer layer lies in the range of 30° to 40°.

Further, preferably, in the relationship between the retardation $\Delta nd1$ which is obtained by the product of the double refractive index $\Delta n1$ of the nematic liquid crystal layer and the thickness $d1$ of the liquid crystal layer, and the retardation $\Delta nd2$ which is obtained by the product of the double refractive index $\Delta n2$ of the liquid crystal polymer layer and the thickness $d2$ of the liquid crystal polymer layer, the retardation $\Delta nd1$ lies in the range of 0.7 to 0.9 $\mu m$, and the difference $\Delta nd1-\Delta nd2$ lies in the range of 0.1 to 0.3 $\mu m$.

Still further, preferably, the direction of the preferential view angle of the liquid crystal device is set to any one direction, with reference to a clock face, at two-thirty, four-thirty, seven-thirty, or ten-thirty o'clock.

Still further, preferably, the second polarization board and the twisted phase difference board structures a bonding unit. In the bonding unit, by utilizing the fact that the angle between the absorption axis of the second polarization board and the molecule-oriented direction of the upper polymer of the liquid crystal polymer layer lies in the range of 30° to 40°, the second polarization board structured of a rolled film and the twisted phase difference board also structured of a rolled film, are superposed on each other and bonded in the same roll-out direction. After bonding to each other, the bonding unit can be obtained by cutting to a predetermined size.

Still further, preferably, the liquid crystal polymer layer of the twisted phase difference board has a temperature compensating characteristic in which the retardation $\Delta nd2$ is always smaller than the retardation $\Delta nd1$ of the nematic liquid crystal layer in a predetermined temperature range (preferably, 20° C. to 80° C.).

According to the second aspect of the present invention, in the method for manufacturing the liquid crystal display apparatus comprising the first substrate having the first transparent electrode and the second substrate having the second transparent electrode; the liquid crystal devices holding the nematic liquid crystal layer which is twisted and oriented by the twist angle of the STN (preferably, in the range of 180° to 270°) between the first and second substrates; the first polarization board which is provided for an outside of the first substrate; the twisted phase difference board having the liquid crystal polymer layer and provided for the outside of the second substrate; and the second polarization board provided for the outside of the twisted phase difference board; wherein the angle between the absorption axis of the second polarization board and the molecule-oriented direction of the upper polymer of the liquid crystal polymer layer lies in the range of 30° to 40°, a) structuring the second polarization board in the shape of a rolled film;
b) structuring the twisted phase difference board in the shape of a rolled film;
c) by utilizing the fact that the angle lies in the range of 30° to 40°, arranging the roll-out direction of the rolled film of the second polarization board so as to become the same roll-out direction of the rolled film of the twisted phase difference board;
d) superposing the rolled film of the second polarization board on the rolled film of the twisted phase difference board, and adhering these rolled films when simultaneously rolling out these rolled films; and
e) manufacturing the bonding unit structured by the second polarization board and the twisted phase difference board by cutting the bonding unit to the predetermined size after an adhesion step.

BRIEF EXPLANATION OF THE DRAWINGS

FIG. 2 shows data of various angles when performing experiments 1 to 7 by changing angles arranged between the twisted phase difference board and the polarization board using the twisted phase difference board used in the present invention;

FIG. 3 shows data of the relationship of the arranged angles when a desirable display image was finally obtained based on the data shown in the following FIGS. 4 to 10, and is shown by the data expressed based in the same manner as shown in FIG. 2;

FIG. 22 is an explanatory view for indicating evaluation of the image quality of the liquid crystal display apparatus which is provided by the relationship of the arranged angles of "FINAL 1" to "FINAL 3" shown in FIG. 3;

FIG. 26 is an explanatory view for explaining cutting of the upper polarization board and the twisted phase difference board in an actual manufacturing method of the liquid crystal display apparatus according to the present invention;

BEST MODE FOR CARRYING OUT THE PRESENT INVENTION

The preferred embodiments of the present invention will be explained with reference to the drawings below.

Figure 1:
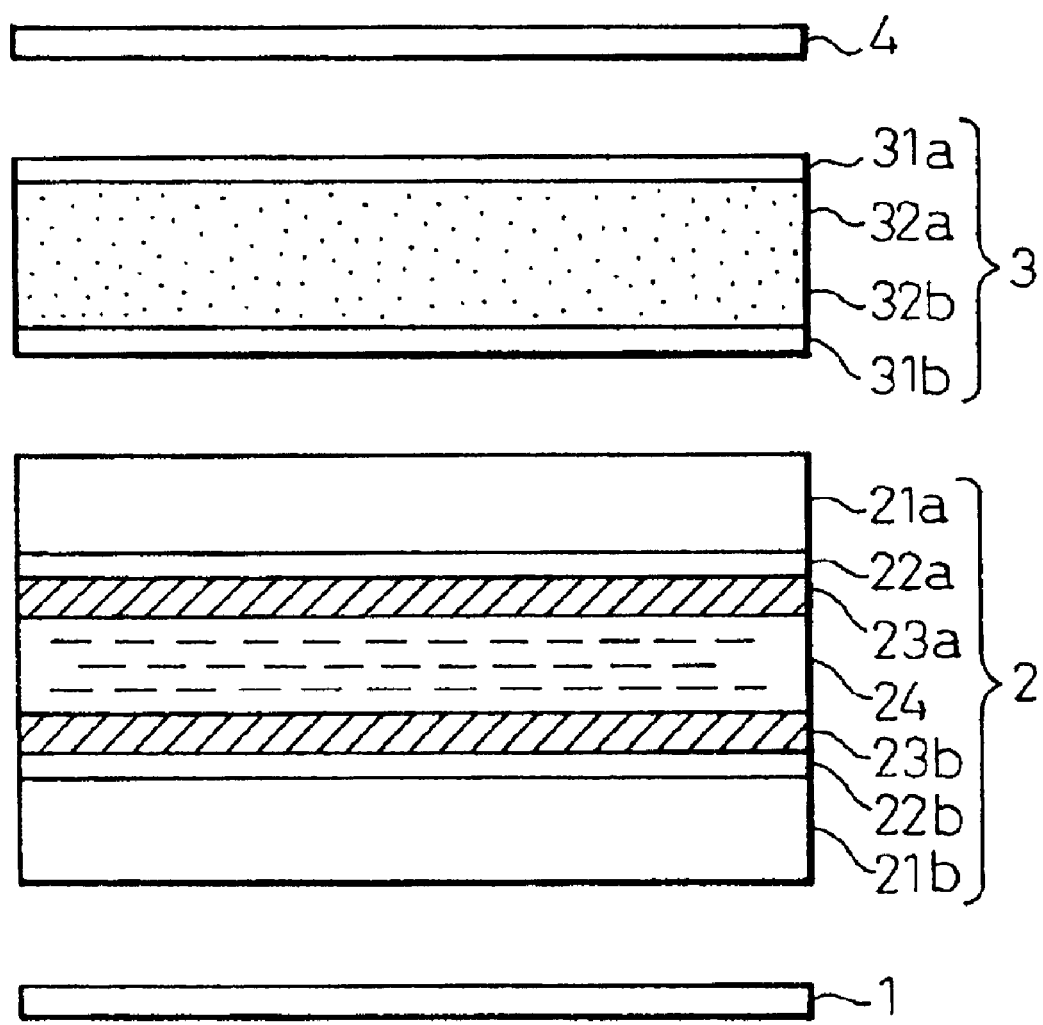
FIG. 1 is an essential structural view of the liquid crystal display apparatus of the present invention.

FIG. 1 is an essential structural view of the liquid crystal display apparatus according to the present invention. In the drawing, reference number 1 denotes a first polarization board, 2 is a liquid crystal device, 3 is a twisted phase difference board, and 4 is a second polarization board. The liquid crystal device 2 is structured by holding the liquid crystal layer 24, and by the first substrate 21b and the second substrate 21a, the first transparent electrode 22b and the second transparent electrode 22a, and the first alignment film (lower) 23b and the second alignment film (upper) 23a. Further, the twisted phase difference board 3 is structured by coating the liquid crystal polymer on the transparent film substrate 31b, performing alignment process at high temperature so as to obtain a desirable twisted angle, rapidly cooling and fixing it, and coating the hardcoart layer 31a.

In this example, the twisted phase difference board 3 is provided between the liquid crystal device 2 and the second polarization board 4, and the following is explained with respect to this arrangement. However, since the same effect can be obtained if the twisted phase difference board 3 is provided between the liquid crystal device 2 and the first polarization board 1, the explanation is omitted.

Further, the twisted phase difference board 3 has a characteristic which can adjust freely and independently the retardation for the direction of the thickness. The present invention defines the above-mentioned optimum relationship of the angle based on various experiments explained below by utilizing the above-mentioned characteristics. As the twisted phase difference board 3, a model "LC film" which was provided by NIPPON PETROLEUM & CHEMICAL CO., LTD. and is available in the market, was used.

FIG. 2 shows data of various angles when performing experiments 1 to 7 by changing various conditions, i.e., the relationship of the arranged angles, using the twisted phase difference board 3 used in the present invention. In this experiment, a horizontal axis (an x-axis) at the direction of the hands showing just three o'clock is defined as 0°, the angle for anticlockwise is defined as "plus", and the angle for clockwise is defined as "minus". The following FIGS. 4 to 10 show the data when changing the retardation and wavelength in accordance with the above angle conditions.

Further, FIG. 3 shows data of the relationship of the arranged angles when a desirable display image was finally obtained based on the data shown in FIGS. 4 to 10. In FIG. 3, the best quality of the display image can be obtained in the relationship of the angle shown by "FINAL", and it is possible to realize low cost apparatus.

Figure 4:
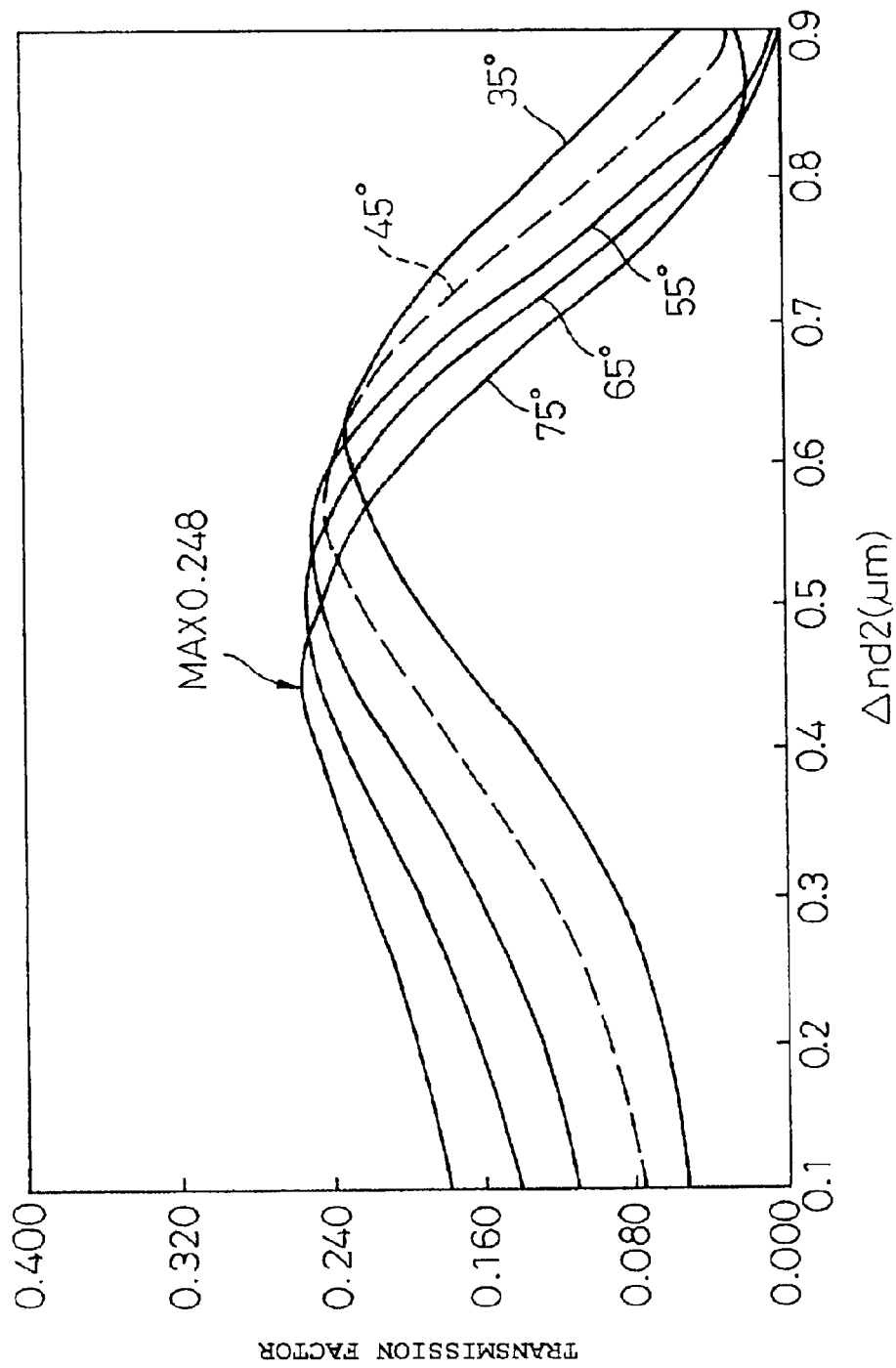
FIG. 4 is a graph which corresponds to experiment 1 in FIG. 2 for indicating the relationship between the retardation $\Delta nd$ and the transmission factor of the twisted phase difference board.

In FIGS. 2 and 3, the "upper (second) polarization board" corresponds to the second polarization board 4 in FIG. 4; the "twisted phase difference board" corresponds to the twisted phase difference board 3 in FIG. 3; the "upper polymer molecule" corresponds to the upper polymer 32a in FIG. 1; the "lower polymer molecule" corresponds to the lower polymer 32b in FIG. 1; the "liquid crystal cell" corresponds to the liquid crystal device 2 in FIG. 1; the "upper liquid crystal molecule" corresponds to the liquid crystal molecule in the second alignment film 23a in FIG. 1; the "lower liquid crystal molecule" corresponds to the liquid crystal molecule in the first alignment 23b in FIG. 1; and the "lower (first) polarization board" corresponds to the absorption axis of the first polarization board 1 in FIG. 1.

The data of the experiment numbers 1 to 7 in FIG. 2 are shown in the graphs shown in FIGS. 4 to 10. That is, the experiment number 1 corresponds to FIG. 4; the experiment number 2 corresponds to FIG. 5; the experiment number 3 corresponds to FIG. 6; the experiment number 4 corresponds to FIG. 7; the experiment number 5 corresponds to FIG. 8; the experiment number 6 corresponds to FIG. 9; and the experiment number 7 corresponds to FIG. 10. Further, FIG. 11 shows data of the phase difference board used in the prior art, and is provided for comparing the effect of the present invention with that of the prior art.

In the following explanations, a twist angle 240° is used for all liquid crystal cells, and the retardation $\Delta nd1$ is 0.84 $\mu$m. UP is the angle of the absorption axis of the upper (second) polarization board, LP is the angle of the absorption axis of the lower (first) polarization board, and LCP is the liquid crystal polymer.

When the STN is used as the liquid crystal device, it is preferable to use the twist angle in the range of 180° to 270°. This is because, when the twist angle exceeds 270°, an increase in failures of the alignment and deterioration of the response characteristic are confirmed experimentally, and deterioration of the slope of the characteristic are also confirmed experimentally at the angle 180° or less. Although the twist angle 240° was used in this embodiment according to the present invention, if the twist angle lies in the range of 180° to 270°, it is confirmed that the present invention can be applied to the liquid crystal.

In FIG. 4, the ordinate is transmission factor, and the abscissa is retardation $\Delta nd2$ of the liquid crystal polymer layer (twisted phase difference board), and this graph shows the relationship between the transmission factor and the retardation $\Delta nd$ in the case of the UP being in the range of +35° to +75° and the LP being −15° (fixed). In this case, for other angles, the upper polymer molecule is −70°, and the lower polymer molecule is +70° as shown by the experiment number 1 in FIG. 2.

As shown in the drawing, when the UP is +75°, and when the retardation $\Delta nd2$ is 0.45 $\mu$m, the maximum brightness is 0.248.

As mentioned above, when the UP is +75°, and when the retardation $\Delta nd2$ is 0.45 $\mu$m, the maximum brightness 0.248 was obtained. However, the white color which is very close to the blue color is found in the spectral characteristic of the above data, and this was undesirable visually.

Figure 5:
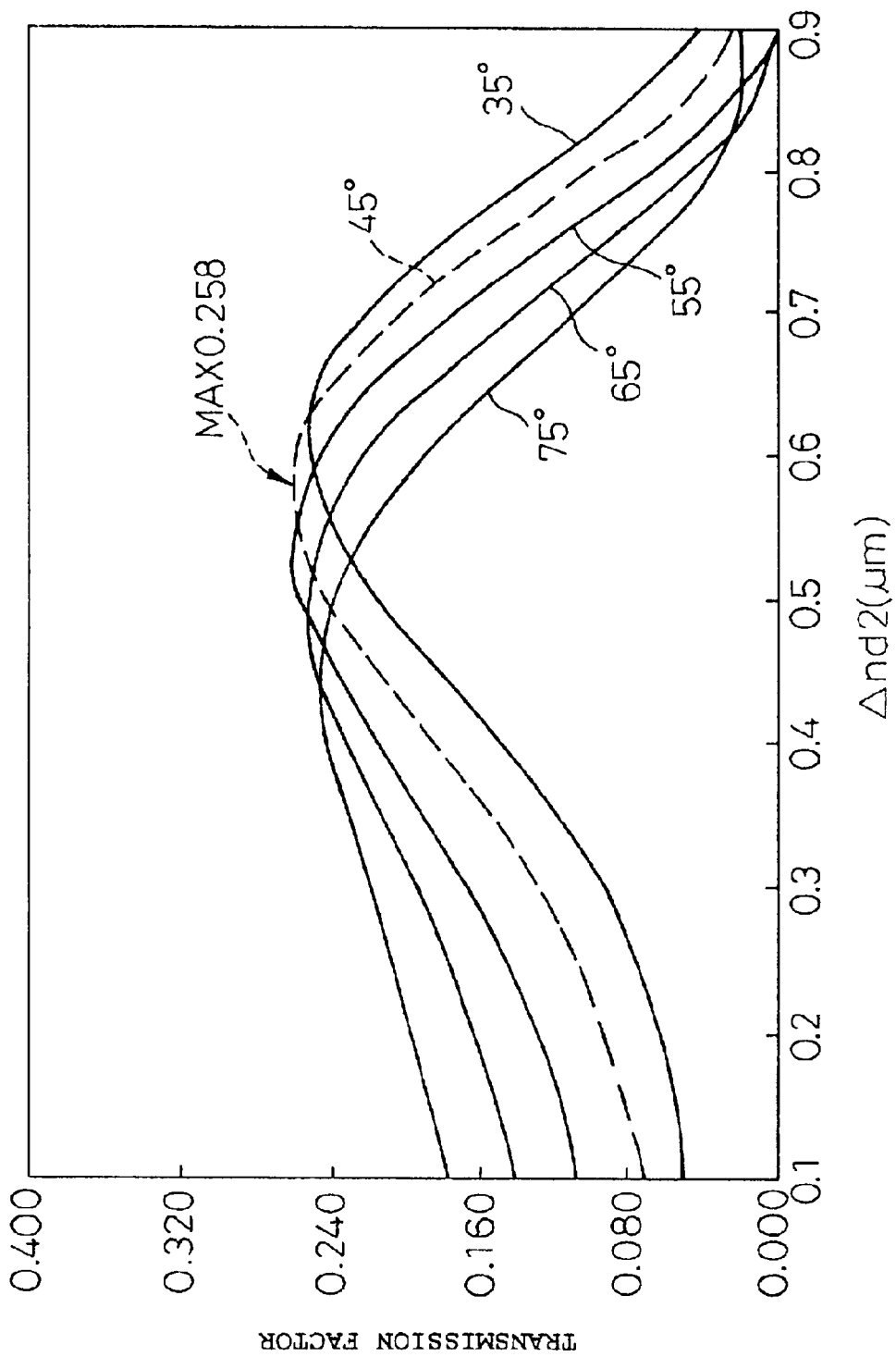
FIG. 5 is a graph which corresponds to experiment 2 in FIG. 2 for indicating the relationship between the retardation $\Delta nd$ and the transmission factor of the twisted phase difference board.

In FIG. 5, as well as FIG. 4, the ordinate is transmission factor, and the abscissa is retardation $\Delta nd2$ of the liquid crystal polymer layer, and this graph shows the relationship between the transmission factor and the retardation Δnd in the case of the UP being in the range of +35° to +75° and the LP being −15° (fixed). In this case, for other angles, the upper polymer molecule is −80°, and the lower polymer molecule is +60° as shown by the experiment number 2 in FIG. 2.

As shown in the drawing, when the UP is +45° and +55°, and when Δnd is about 0.55 μm, the maximum brightness (0.258) is obtained.

As explained above, although the brightness becomes maximum when the UP is +450 (550) and when Δnd is about 0.55 μm, these values are insufficient visually to obtain the desirable image.

Figure 6:
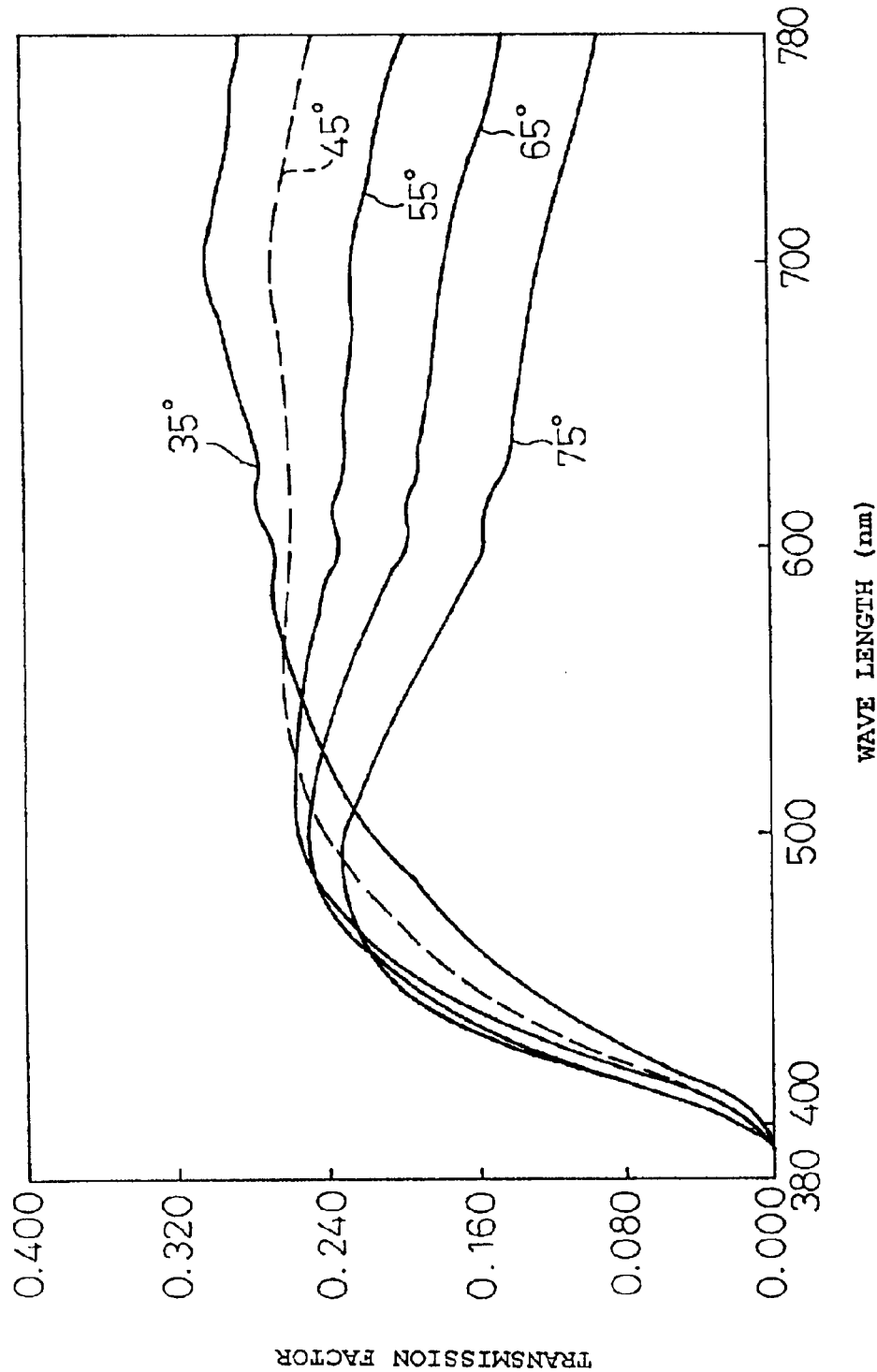
FIG. 6 is a graph which corresponds to experiment 3 in FIG. 2 for indicating the spectral transmission factor and the relationship of the arranged angle of the upper polarization board.

In FIG. 6, an ordinate is transmission factor, and an abscissa is wavelength of the light, and this graph shows the spectral characteristic of the white color when the UP is in the range of +35° to +75° and the LP being −15° (fixed), and the retardation Δnd being 0.6 μm. In this case, the upper polymer molecule is −80°, and the lower polymer molecule is +60°. As shown in the drawing, when the UP is +35°, a high transmission factor is obtained in long wavelength of about 600 nm or more. When the UP is +75°, the maximum transmission factor is obtained in the wavelength of about 500 nm. Further, the transmission factor is decreased in the wavelength of about 500 nm or more. As explained above, the spectral characteristic of the white color (tint) fluctuates widely. However, when the UP is +45° (dotted line), the constant and high transmission factor can be obtained in the wavelength of about 500 nm or more. That is, it is possible to obtain the white color having stable characteristic.

Figure 7:
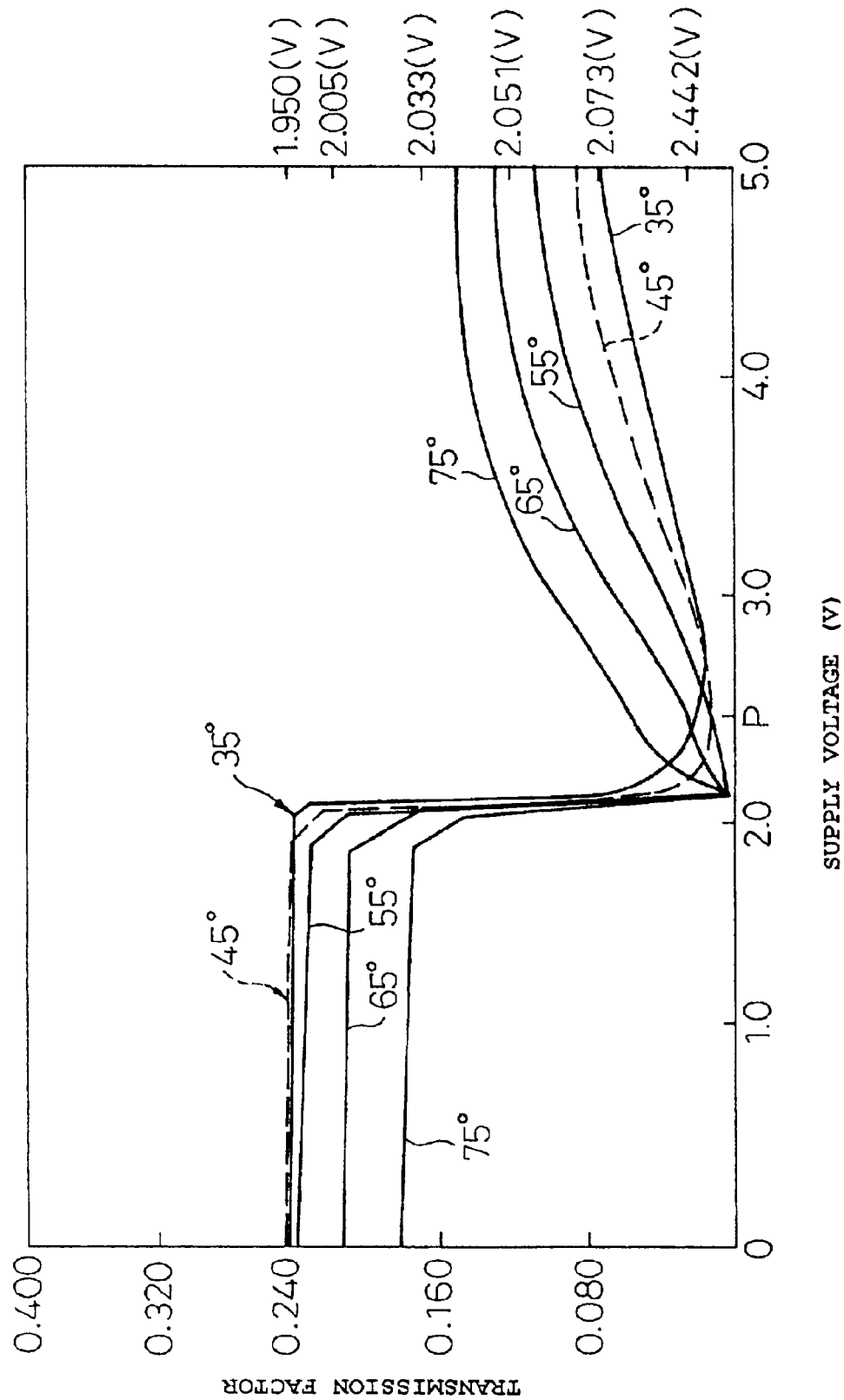
FIG. 7 is a graph which corresponds to experiment 4 in FIG. 2 for indicating the supply voltage/transmission factor and the relationship of the arranged angle of the upper polarization board.

In FIG. 7, the ordinate is transmission factor, and the abscissa is supply voltage, and this graph shows the relationship between the transmission factor and the supply voltage in the case of the UP being in the range of +35° to +75° and the LP being −15° (fixed), and the retardation Δnd1 of the liquid crystal device is 0.6 μm. In this case, the upper polymer molecule is −80°, and the lower polymer molecule is +60°. As shown in the drawing, when the supply voltage is about 2v (within the range from 2v to a point P), and when the UP is +55°, leakage of the light becomes less when the liquid crystal device is turned on, and the contrast (a ratio of the transmission factors of the black and white) becomes good. The UP (an upper polarization board) is set to +50° after visually taking account the white color.

Figure 8:
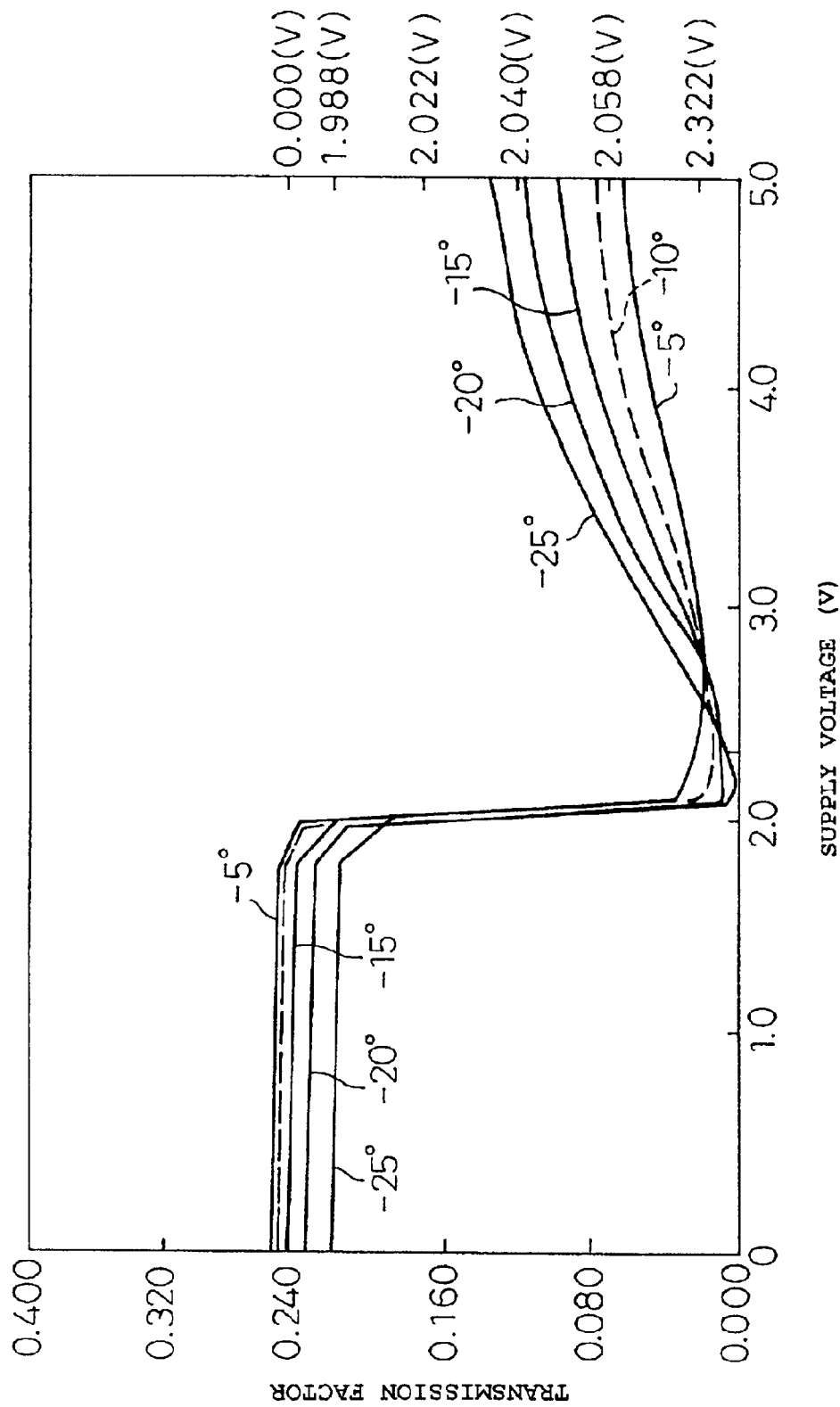
FIG. 8 is a graph which corresponds to experiment 5 in FIG. 2 for indicating the supply voltage/transmission factor and the relationship of the arranged angle of the lower polarization board.

In FIG. 8, the ordinate is transmission factor, and the abscissa is supply voltage, and this graph shows the relationship between the transmission factor and the supply voltage when the UP is +50° (fixed), the LP is in the range of −5° to −25°, and the retardation Δnd1 of the liquid crystal device is 0.6 μm. In this case, the upper polymer molecule is −80°, and the lower polymer molecule is +60°. As shown in the drawing, when the LP is small, the white color becomes bright, but a black color is hard to obtain. Accordingly, when the LP is about −10°, a good result can be obtained.

Figure 9:
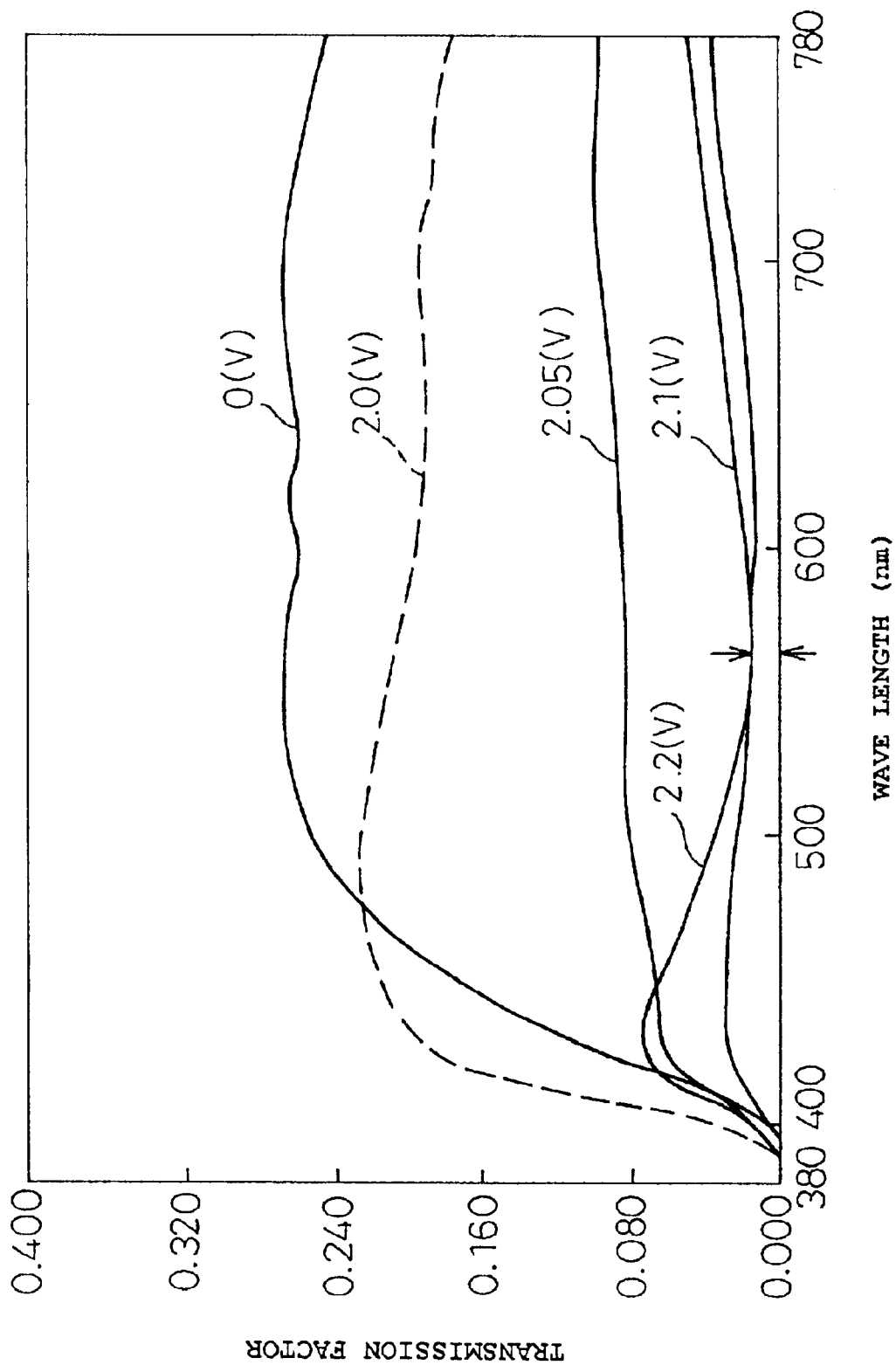
FIG. 9 is a graph which corresponds to experiment 6 in FIG. 2 for indicating the spectral transmission factor showing the result of the above-mentioned data.

In FIG. 9, the ordinate is transmission factor, and the abscissa is a wavelength of light, and this graph shows the relationship between the transmission factor and the wavelength when the UP is +50° (fixed), the LP is −10° (fixed), and the retardation Δnd1 of the liquid crystal device is 0.6 μm. The supply voltage is used as a parameter. In this case, the upper polymer molecule is −80°, and the lower polymer molecule is +60°.

As shown in the drawing, when the supply voltage is changed in the range of 0v to 2.2v, the spectral characteristic becomes normal white at 0 volt, and is also normal at the halftone in the range of 2.0v to 2.05v. Further, the spectral characteristic becomes black with a slightly blue color (this is because the transmission factor does not reach 0v, as shown by arrows).

Figure 10:
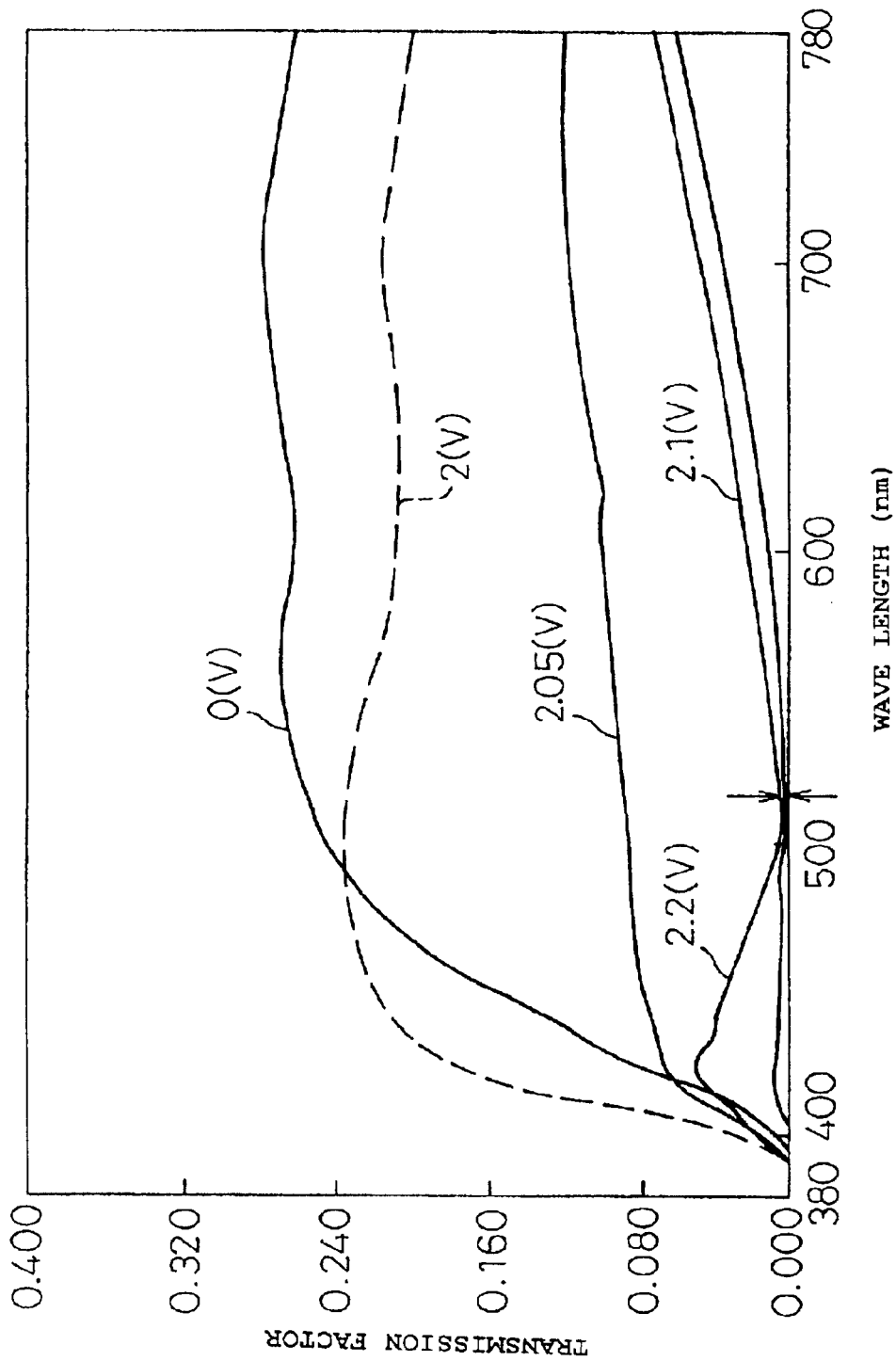
FIG. 10 is a graph which corresponds to experiment 7 in FIG. 2 for indicating the spectral transmission factor based on the relationship between the twisted phase difference board and the twist angle.
Figure 11:
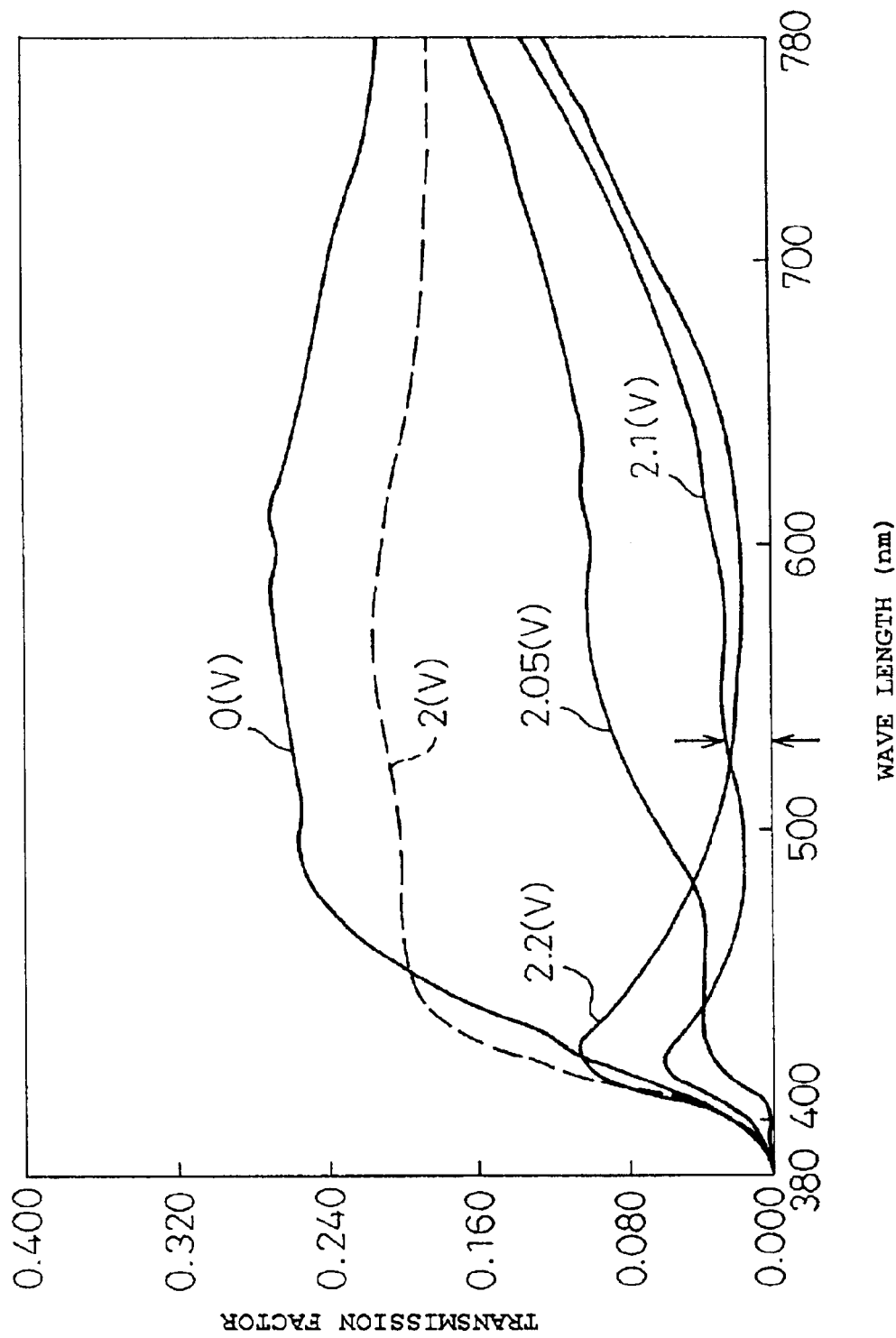
FIG. 11 is a graph of the spectral transmission factor of the liquid crystal display apparatus using a uniaxial-oriented film.
Figure 12:
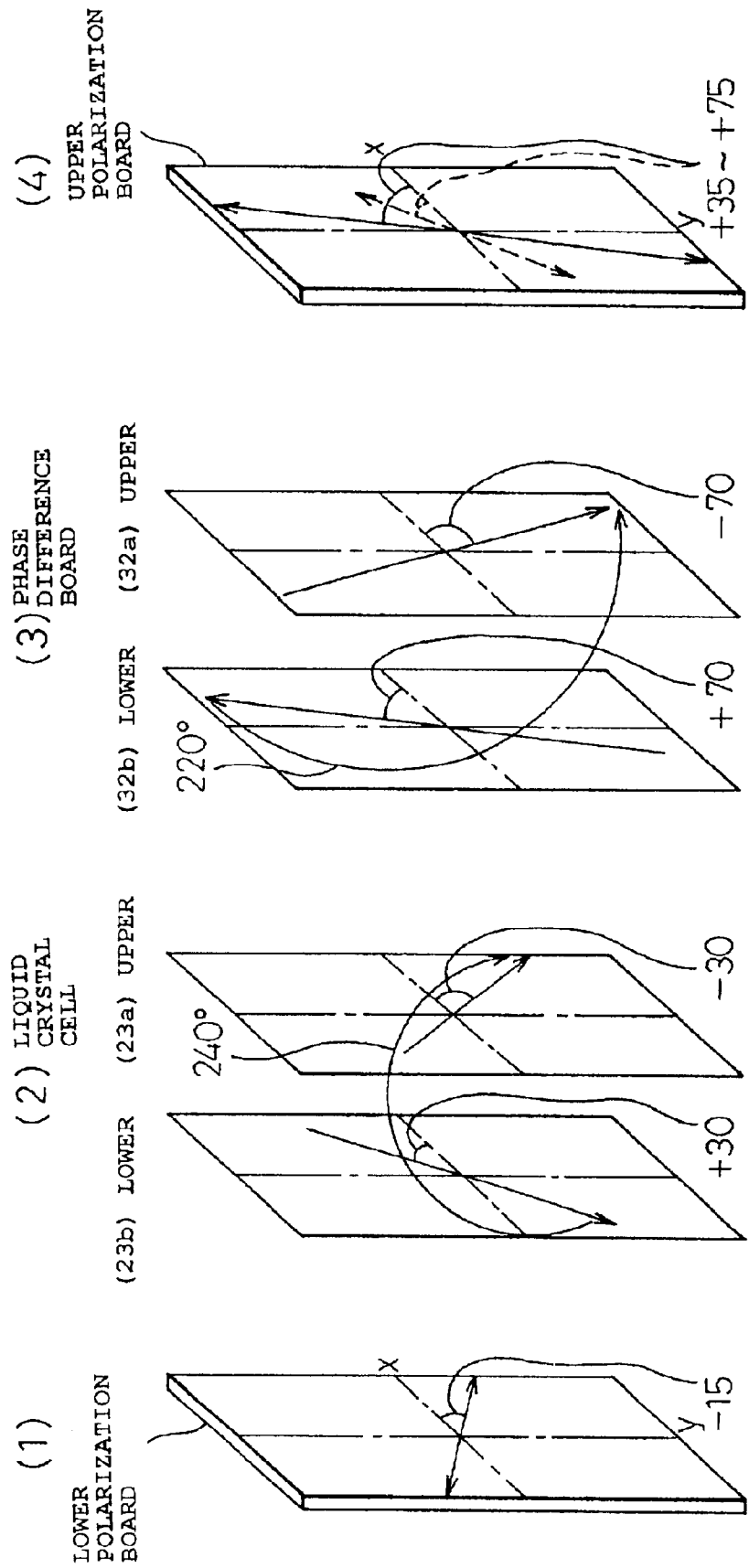
FIG. 12 is an explanatory view for schematically explaining the relationship of the arranged angle which is shown by experiment 1 in FIG. 2.
Figure 13:
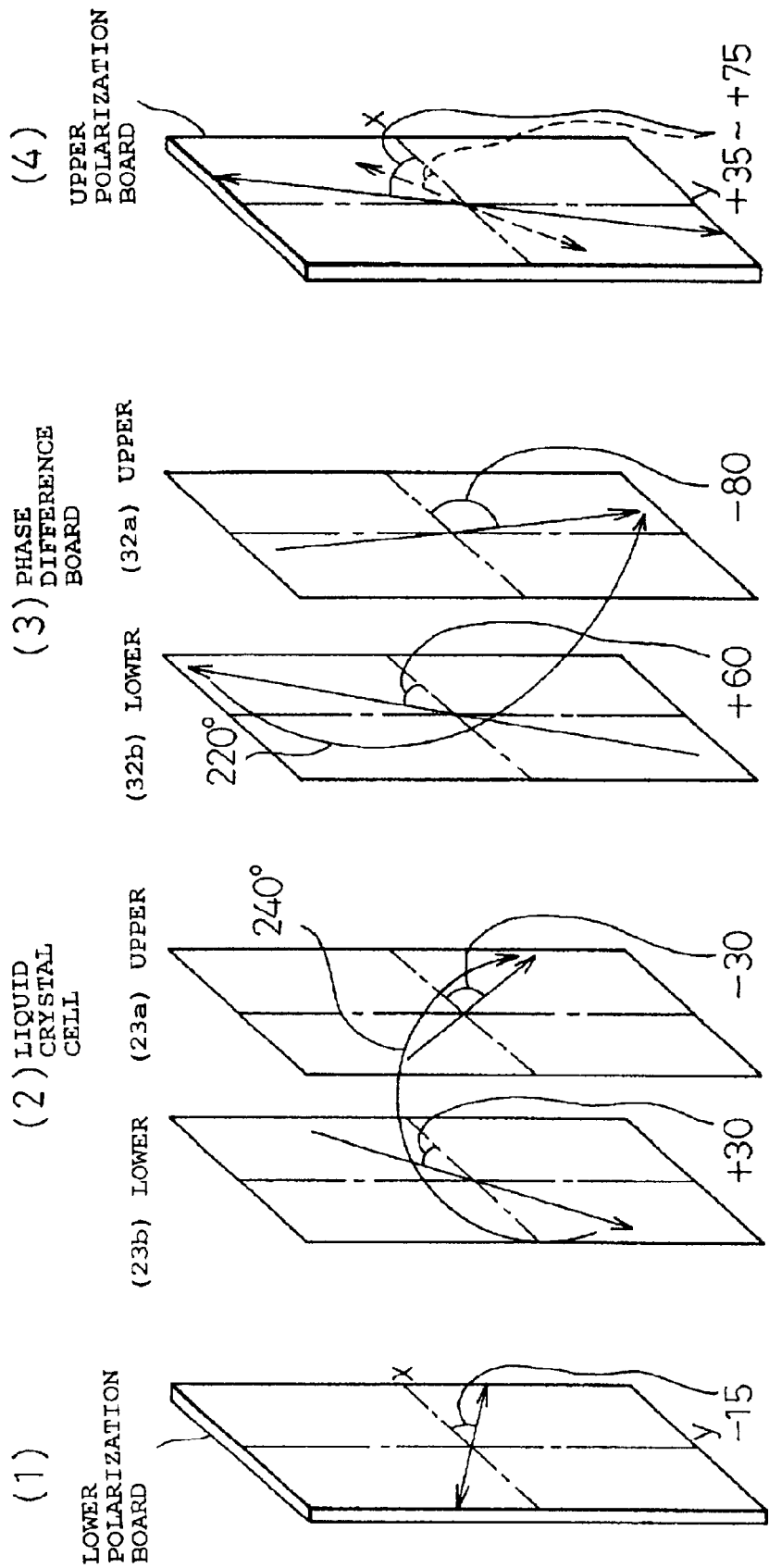
FIG. 13 is an explanatory view for schematically explaining the relationship of the arranged angle which is shown by experiment 2 in FIG. 2.
Figure 14:
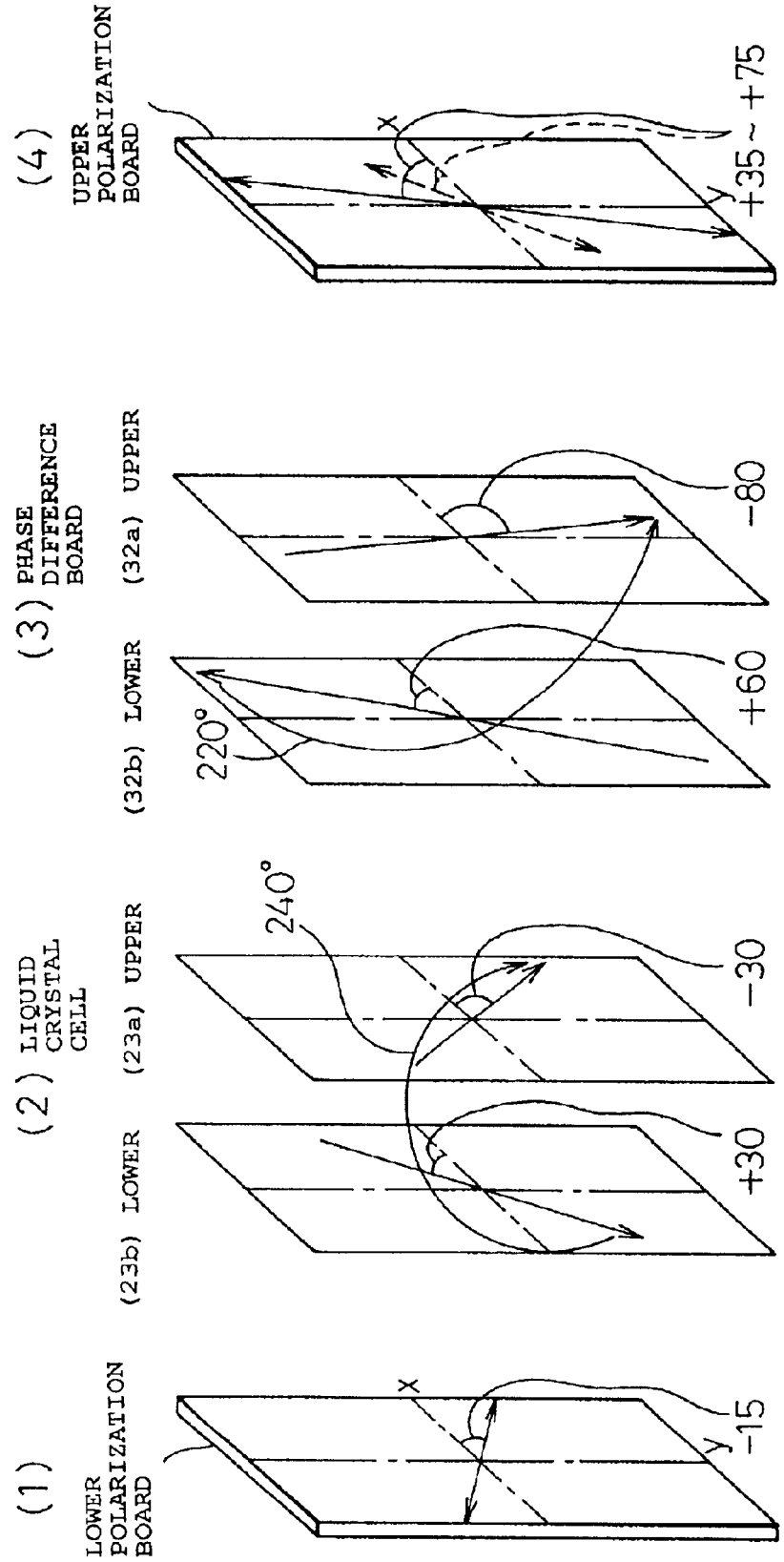
FIG. 14 is an explanatory view for schematically explaining the relationship of the arranged angle which is shown by experiment 3 in FIG. 2.
Figure 15:
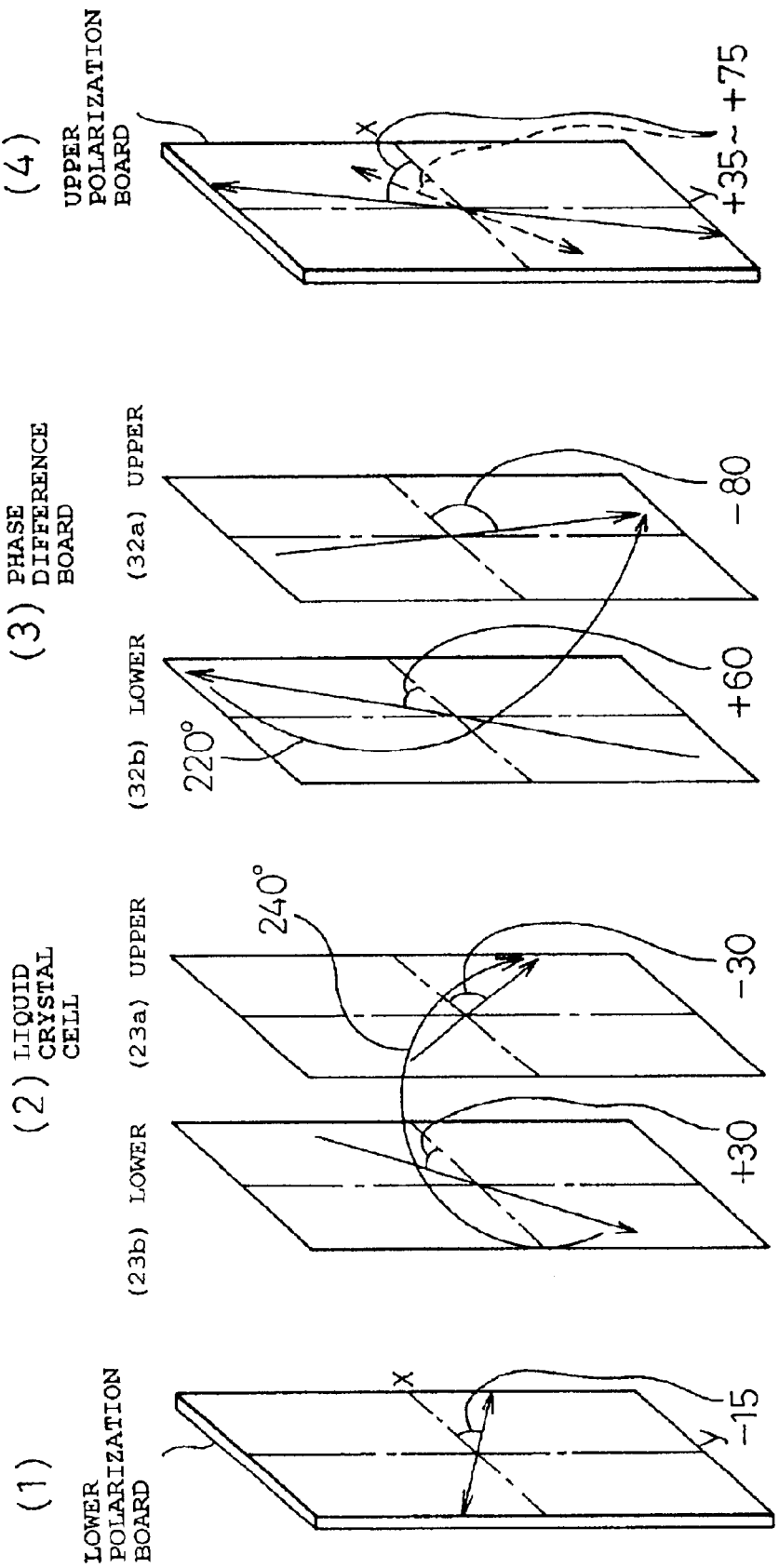
FIG. 15 is an explanatory view for schematically explaining the relationship of the arranged angle which is shown by experiment 4 in FIG. 2.
Figure 16:
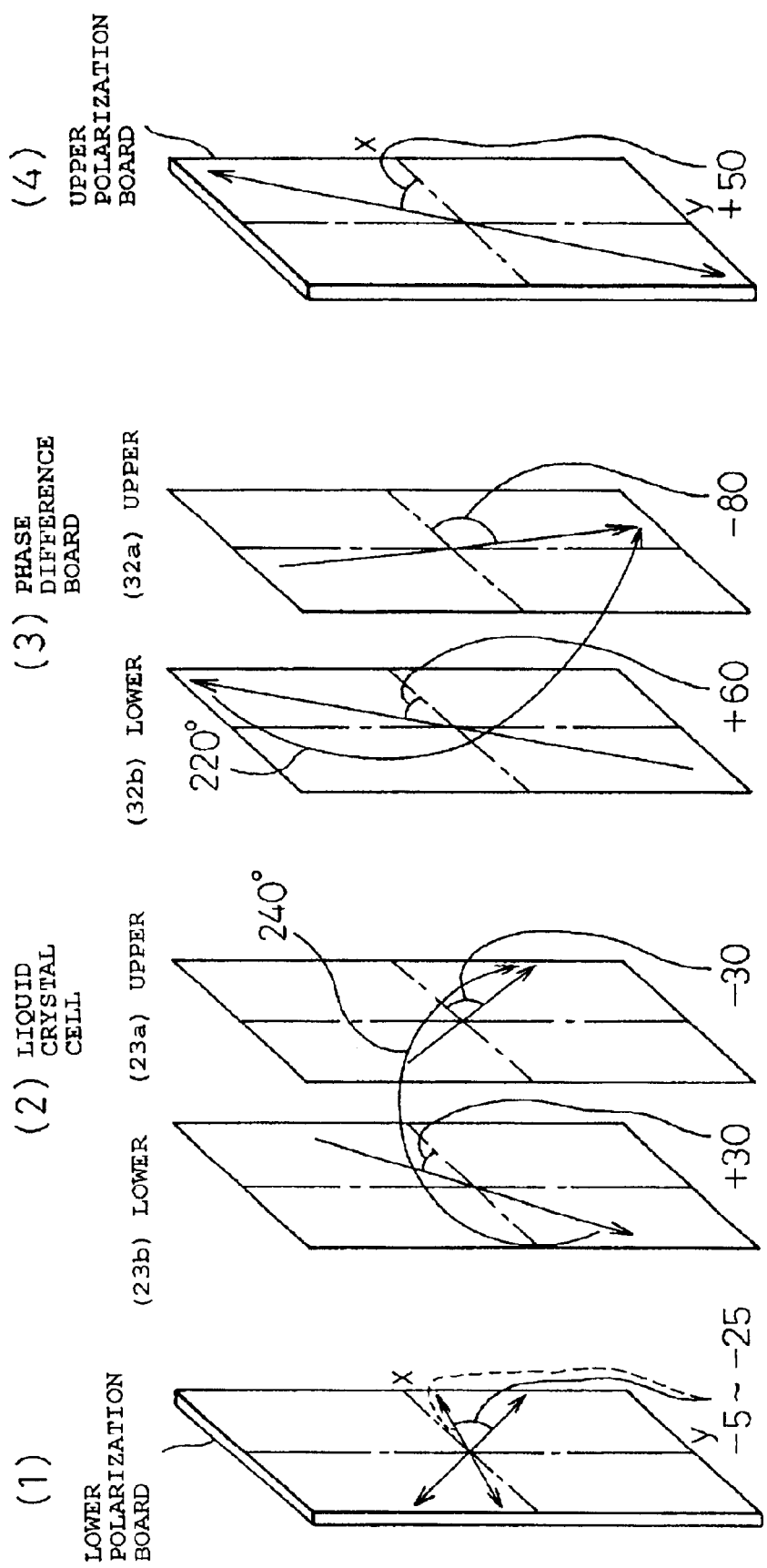
FIG. 16 is an explanatory view for schematically explaining the relationship of the arranged angle which is shown by experiment 5 in FIG. 2.
Figure 17:
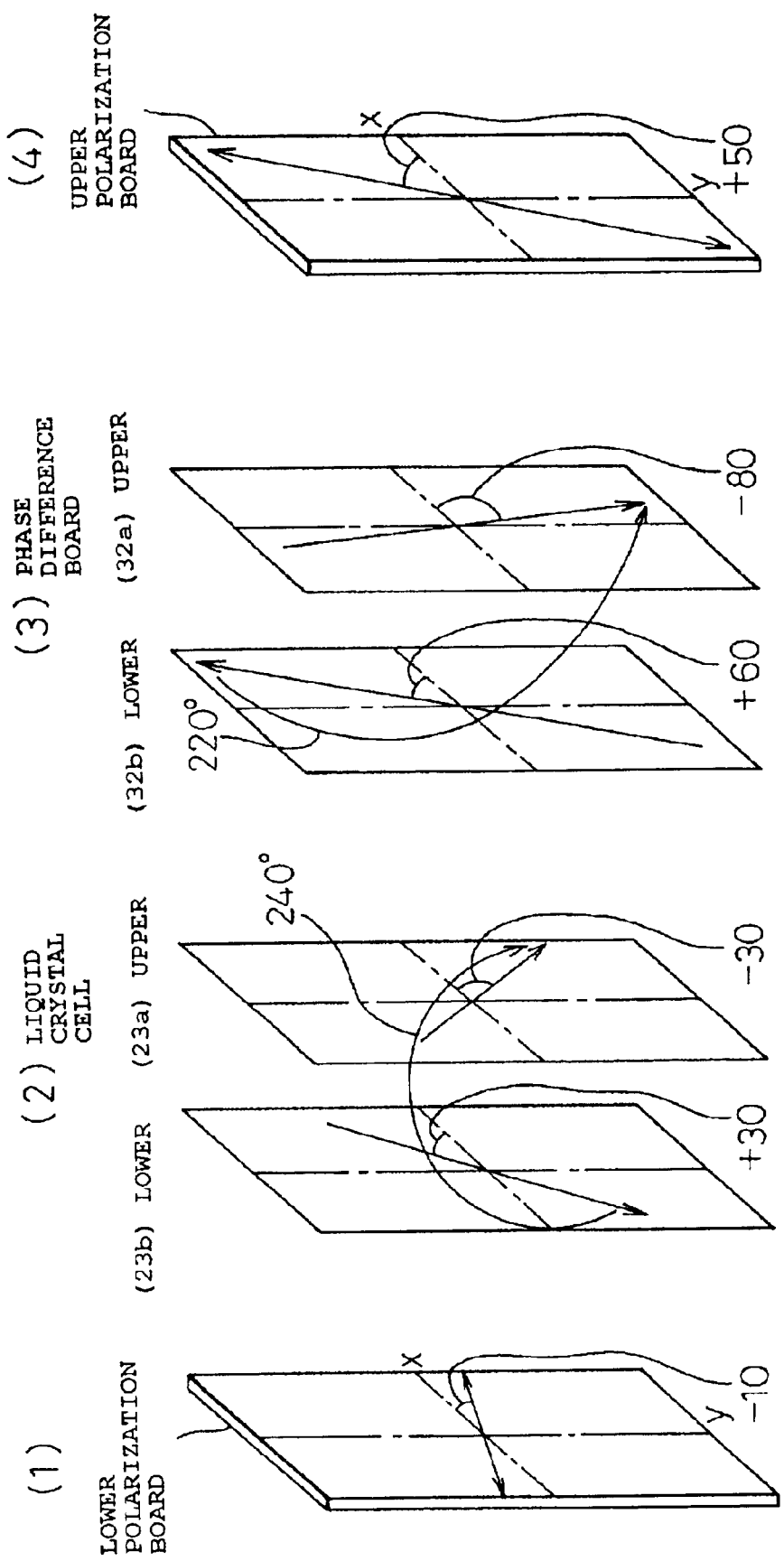
FIG. 17 is an explanatory view for schematically explaining the relationship of the arranged angle which is shown by experiment 6 in FIG. 2.

In FIG. 10, the ordinate is transmission factor, and the abscissa is a wavelength of light. This graph shows the relationship between the transmission factor and the wavelength in the case that the twist angle of the twisted phase difference board is +200° (in the above mentioned case, this angle is +220°). Further, this graph shows the relationship when the UP is +40° (fixed), the LP is −15° (fixed), and the retardation Δnd1 of the liquid crystal device is 0.6 μm. The supply voltage is used as a parameter. In this case, the upper polymer molecule is −100°, and the lower polymer molecule is +60°.

As shown in the drawing, when the supply voltage is changed in the range of 0v to 2.2v, the spectral characteristic becomes the normal white at 0 volt, and the desirable black can be obtained in the range of 2.1v to 2.2v (this is because the transmission factor reaches perfectly 0 when the wavelength is about 500 nm.

In FIG. 11, the ordinate is transmission factor, and the abscissa is a wavelength of light. This graph shows the relationship between the transmission factor and the wavelength when the supply voltage is used as the parameter in the liquid crystal display apparatus using the phase difference board of a conventional uniaxial oriented film. This is a product specification of the phase difference board made of a uniaxial oriented polycarbonate film which is used in the conventional product by the applicant. In this example, however, since the white color (when the supply voltage is 0v) becomes light blue, the halftone becomes light brown and the black color is changed to blue from brown, it is necessary to improve the conventional phase difference board (as shown by arrows, the transmission factor does not reach 0, and a color close to black remains.

FIGS. 12 to 18 are explanatory views for schematically explaining arrangement relationships (angles) shown in FIGS. 4 to 10. That is, FIG. 12 corresponds to the experiment 1 of FIG. 2, FIG. 13 corresponds to the experiment 2 of FIG. 2, FIG. 14 corresponds to the experiment 3 of FIG. 2, FIG. 15 corresponds to the experiment 4 of FIG. 2, FIG. 16 corresponds to the experiment 5 of FIG. 2, FIG. 17 corresponds to the experiment 6 of FIG. 2 and FIG. 18 corresponds to the experiment 7 of FIG. 2.

Figure 19:
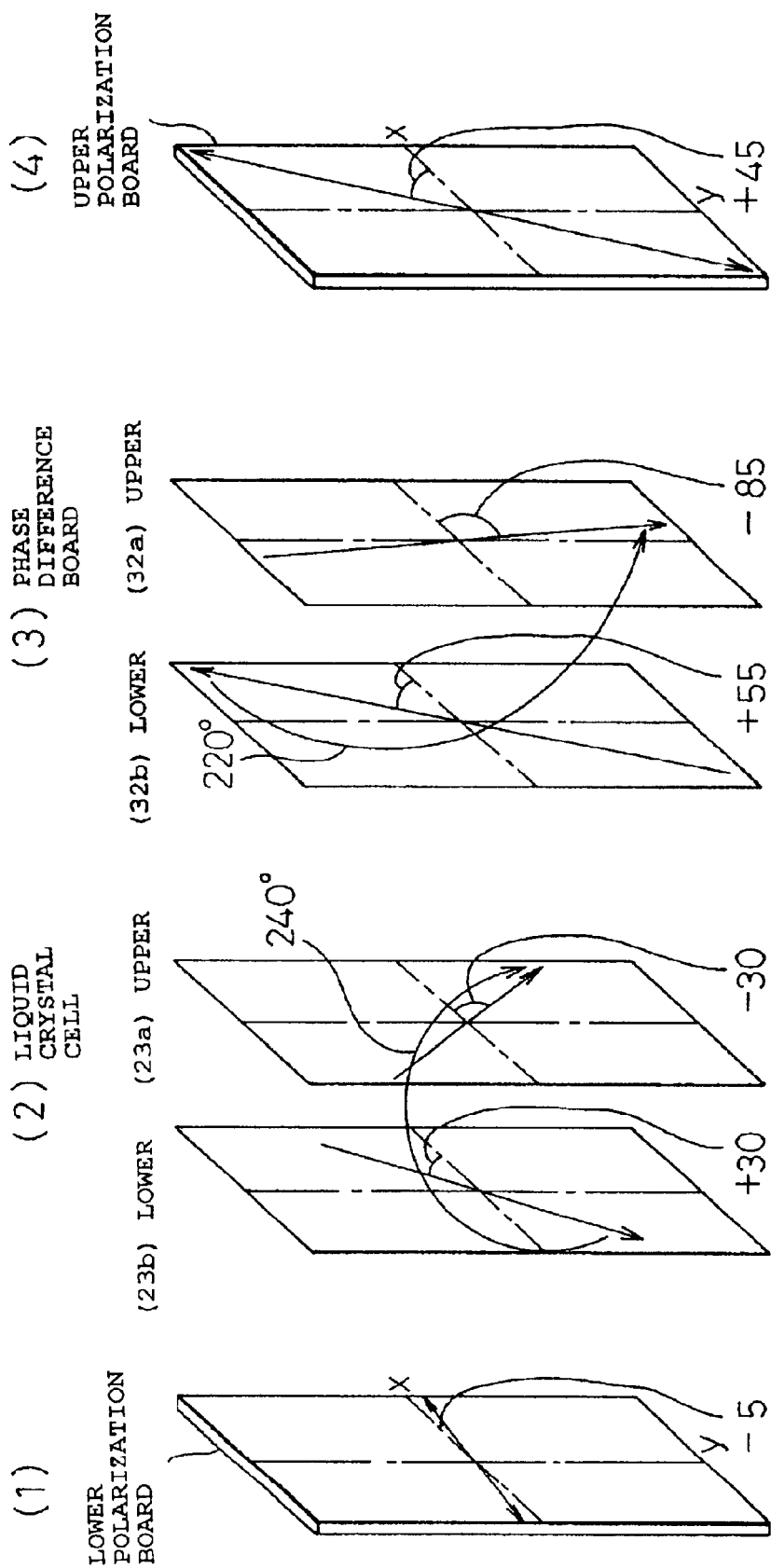
FIG. 19 is an explanatory view for schematically explaining the relationship of the arranged angle which corresponds to "FINAL 1" in FIG. 3.
Figure 20:
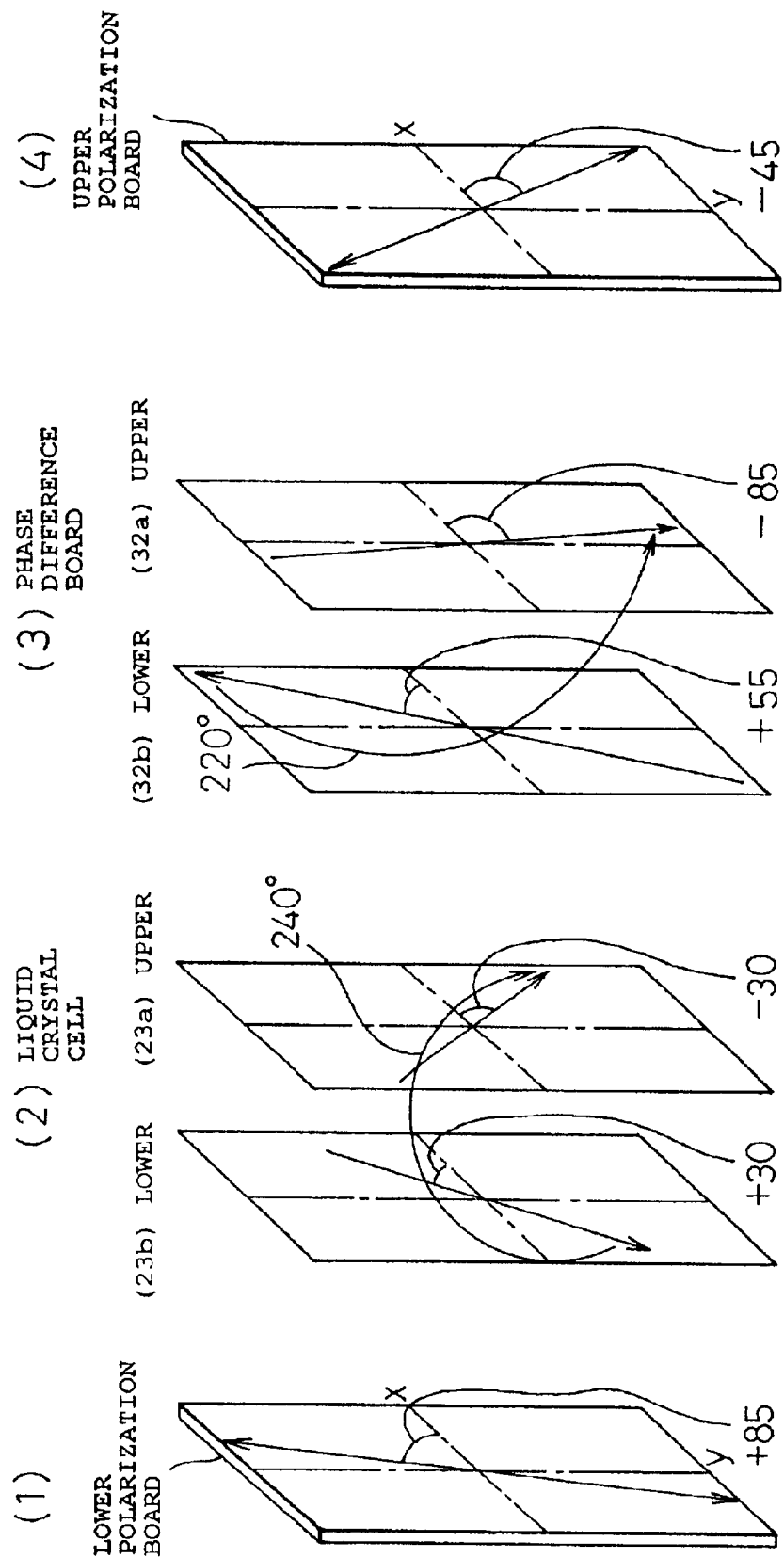
FIG. 20 is an explanatory view for schematically explaining the relationship of the arranged angle which corresponds to "FINAL 2" in FIG. 3.
Figure 21:
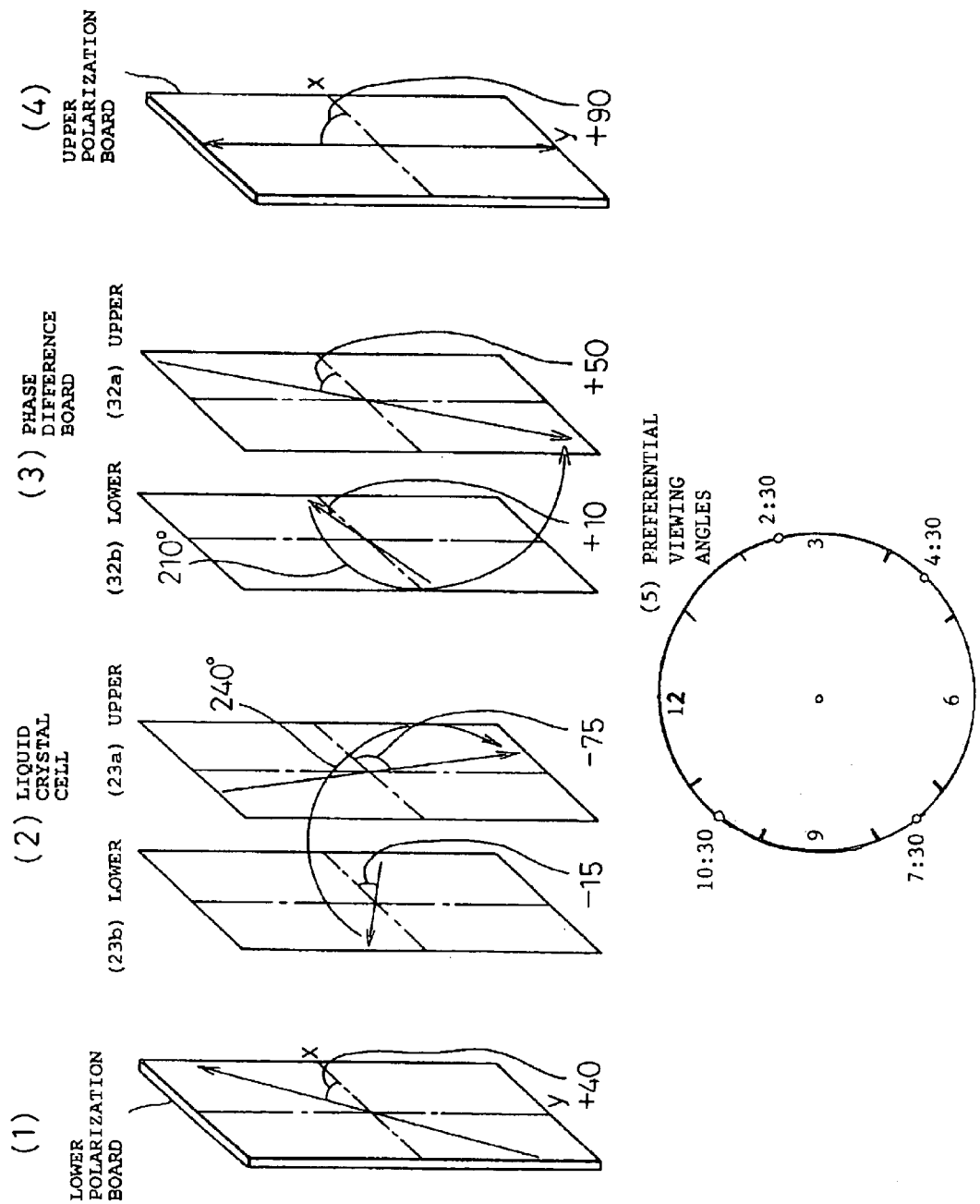
FIG. 21 is an explanatory view for schematically explaining the relationship of the arranged angle which corresponds to "FINAL 3" in FIG. 3.

Further, FIGS. 19 to 21 correspond to FIG. 3. That is, FIG. 19 corresponds to "FINAL 1", FIG. 20 corresponds to "FINAL 2", and FIG. 21 corresponds to "FINAL 3".

Still further, in FIGS. 12 to 21, the "lower polarization board" corresponds to the first polarization board 1 of FIG. 1, the "liquid crystal cell" corresponds to the liquid crystal device 2 of FIG. 1 and the "phase difference board" corresponds to the twisted phase difference board 3 of FIG. 1, and the "upper polarization board" corresponds to the second polarization board 4 of FIG. 1.

In this example, as shown in the drawing, the twist angle between the upper liquid crystal molecule 23a and the lower liquid crystal molecule 23b was set to set to 240° as mentioned above. Further, the twist angle between the upper polymer molecule 32a and the lower polymer molecule 32b of the phase difference board was set to either 220° or 200°.

As mentioned above, the "FINAL 3" is the best in viewpoints of display quality and cost performance.

Figure 23:
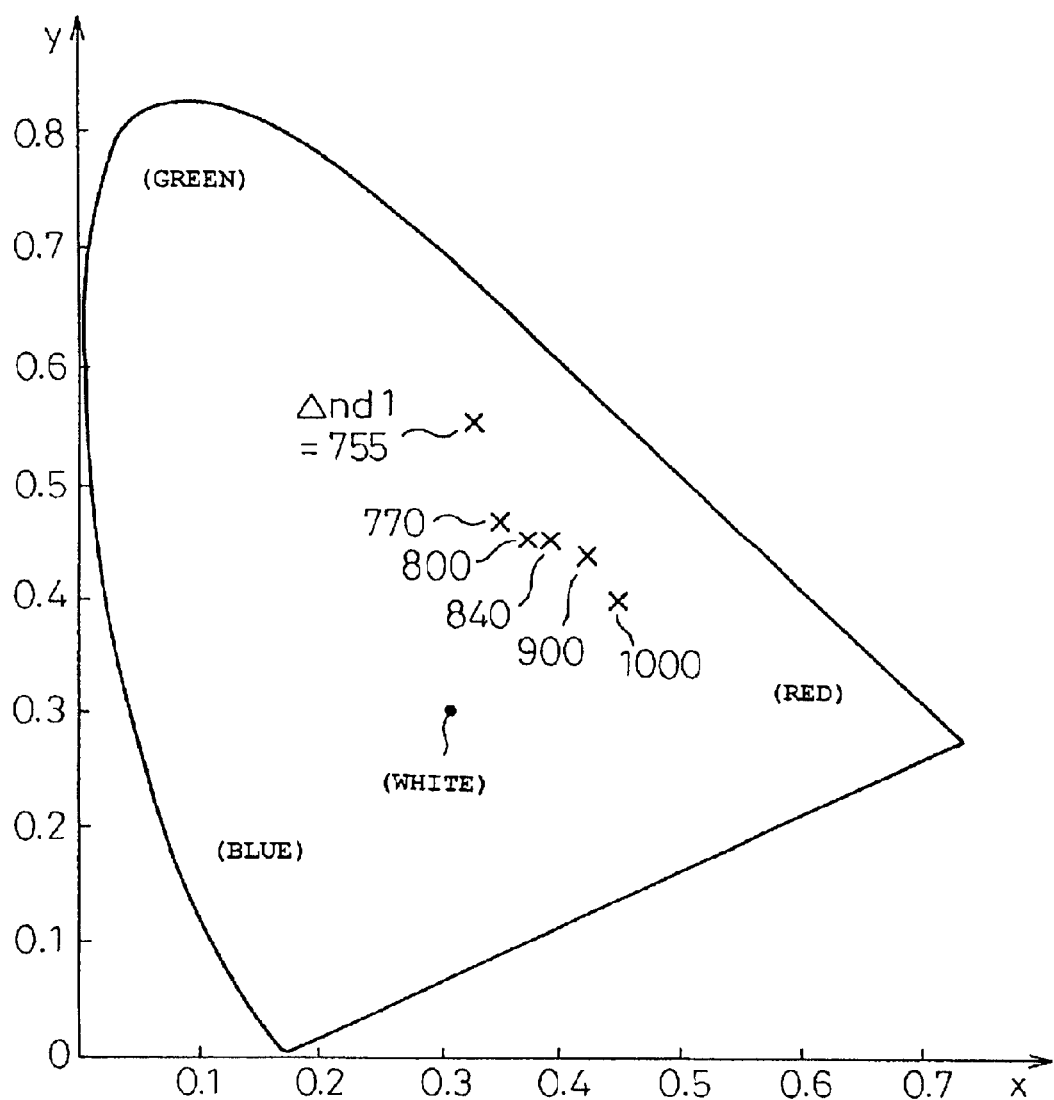
FIG. 23 is a chromaticity diagram indicating a white color at the turned off state of the supply voltage for the liquid crystal device.
Figure 24:
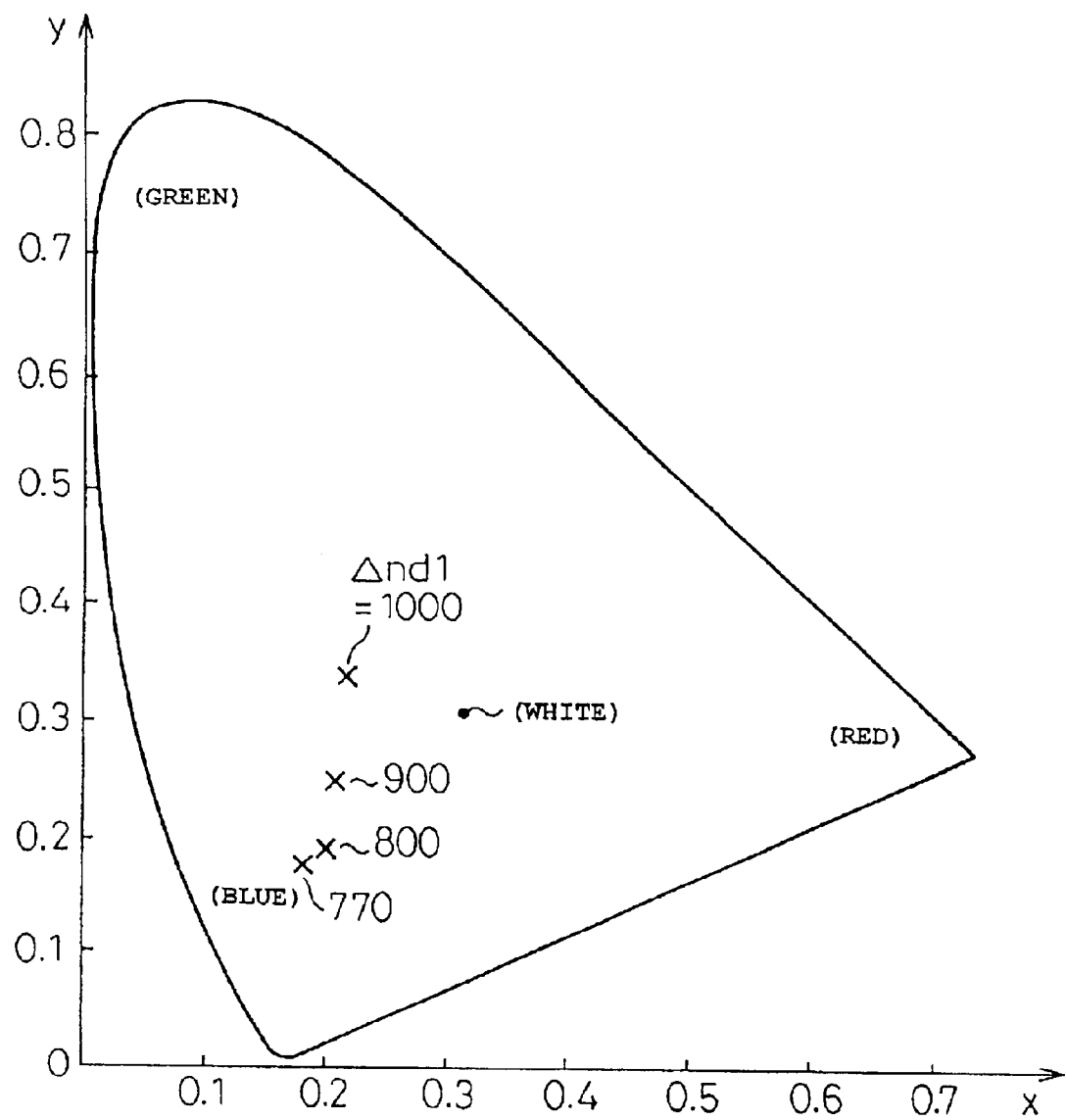
FIG. 24 is a chromaticity diagram indicating a black color at the turned on state of the supply voltage for the liquid crystal device.

FIG. 22 is a view for explaining an evaluation of image quality of the liquid crystal display apparatus using the 220°-twisted phase difference board and the 200°-twisted phase difference board which were prepared based on the angle relationship of "FINAL 1" to "FINAL 3" shown in FIG. 3. FIG. 23 is a chromaticity diagram which shows the white color when the supply voltage to the liquid crystal device is turned off. FIG. 24 is a chromaticity diagram which shows the black color when the supply voltage to the liquid crystal device is turned on.

In FIG. 22, each of values x and y is the value on the chromaticity diagram shown in FIGS. 23 and 24. As shown in the drawing, when the 220°-twisted phase difference board is used, it is possible to improve not only white color (value Y), but also the halftone. According to the evaluation based on the viewpoint of an observer, the characteristic of the view angle can be improved, and the image quality becomes very good. Further, when the 200°-twisted phase difference board is used, the contrast can be improved. Accordingly, the twist angle of the phase difference board is preferable in the range of 200° to 230°. That is, when the twist angle of the phase difference board is set to the angle smaller than that of the liquid crystal device (for example, 240°) in the range of 10° to 40°, the contrast can be improved. On the other hand, when the twist angle of the phase difference board becomes smaller, the contrast becomes worse and it is not preferable.

FIG. 23 is a chromaticity diagram explaining the relationship between the retardation $\Delta nd1$ of the liquid crystal layer and the white color when the supply voltage to the liquid crystal layer is turned off. In the drawing, 755 and 770 are values of the retardation $\Delta nd1$, and are shown by 0.755 $\mu$m and 0.770 $\mu$m. As shown in the diagram, 755 is positioned on the dark yellow-green in the diagram. 770 is positioned on the light yellow-green in the diagram. 800 and 840 are positioned on the green-yellow close to the white in the diagram. 900 and 1000 are positioned on the yellow-white in the diagram.

FIG. 24 is a chromaticity diagram explaining the relationship between the retardation $\Delta nd1$ of the liquid crystal layer and the black color when the supply voltage to the liquid crystal layer is turned on. As well as the above, in the diagram, 770 and 800 are values of the retardation $\Delta nd1$, and are shown by 0.770 $\mu$m and 0.800 $\mu$m. 770 and 800 are positioned on the intermediate of the blue. 900 is positioned on green-blue close to white in the diagram. 1000 is positioned on blue-green close to white in the diagram. Accordingly, although the black having the retardation $\Delta nd1$ of 770 to 990 $\mu$m is colored slightly blue, a good black can be obtained on the display. However, when the retardation $\Delta nd1$ is larger than 900 nm, the black is close to green and it is not preferable. Further, as explained in FIGS. 4 and 5, the difference between $\Delta nd1$ and $\Delta nd2$, i.e., $\Delta nd1-\Delta nd2$, is preferable in the range of 0.1 to 0.3 $\mu$m, in particular, 0.2 to 0.3 $\mu$m.

Figure 25A:
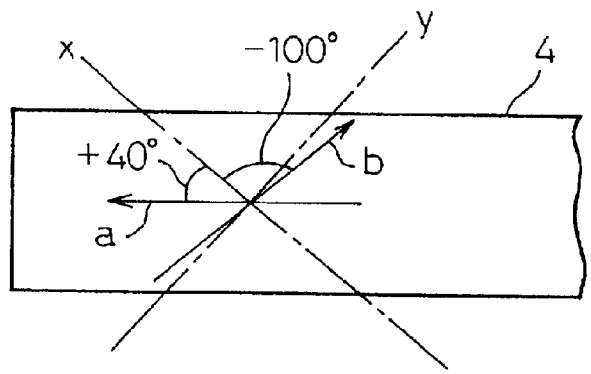
FIGS. 25A and 25B are views for explaining a problem which occurs when cutting the upper polarization board and the twisted phase difference board in a conventional art.
Figure 25B:
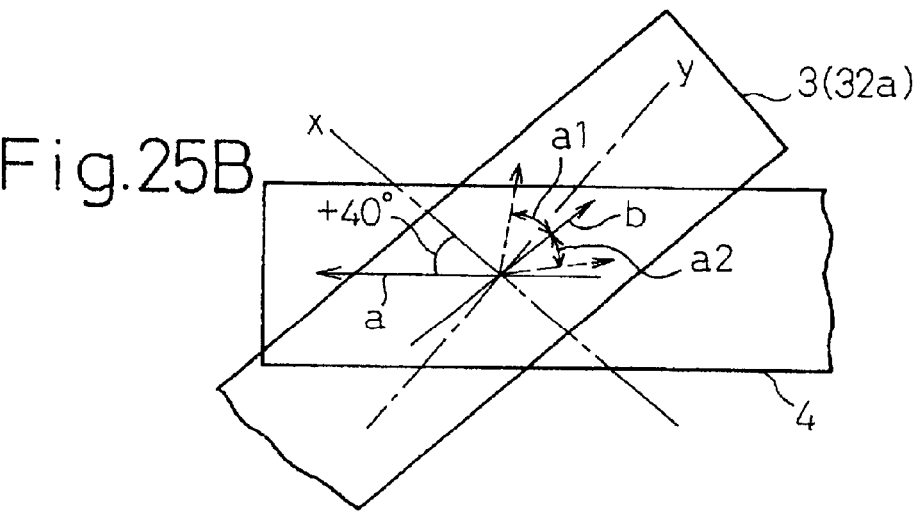
Figure 25C:
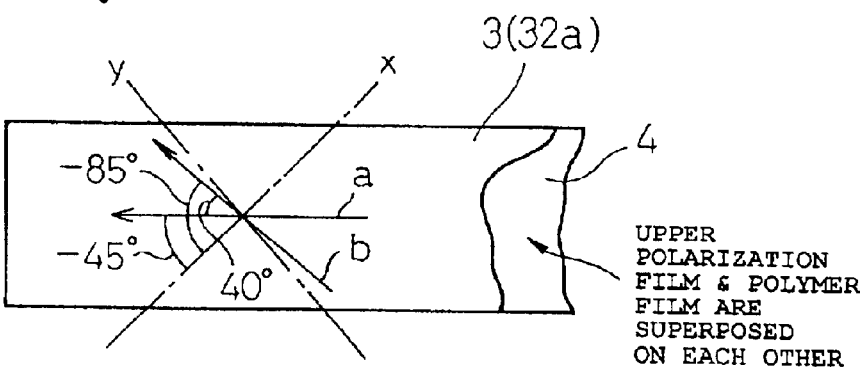
FIGS. 25C and 25D are views for explaining cutting these boards according to the present invention.
Figure 25D:
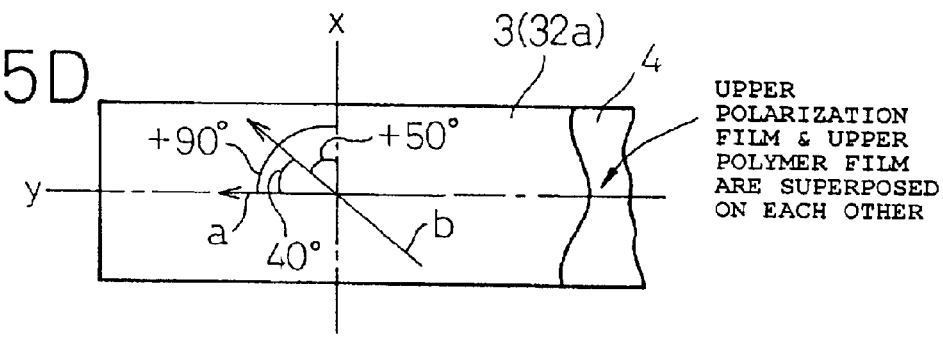

Next, a manufacturing method of the liquid crystal display apparatus according to the present invention is explained with reference to the drawings. FIGS. 25A and 25B are views for explaining problems in material-cutting in the conventional art when cutting the upper polarization board (formed by a rolled film) and the twisted phase difference board (also structured by a rolled film). FIGS. 25C and 25D are views for explaining material-cutting according to the present invention.

As explained in detail below, in the conventional art, there wasconsiderable loss in material-cutting when superposing the twisted phase difference board on the upper polarization board. That is, since there is the relationship between the molecule-oriented direction of the upper polymer and the direction of the absorption axis of the upper polarization board in the liquid crystal polymer layer of the twisted phase difference board, the above two rolled films cannot be directly superposed upon each other as they stand, in the same rolling direction (i.e., roll-out direction) of the twisted phase difference board and the upper polarization board, so that there were considerable loss in material-cutting. Accordingly, this results in increase of parts cost of the liquid crystal display apparatus. In the present invention, it is possible to adhere and wind the twisted phase difference board and the upper polarization board for the same roll-out direction without loss at the material-cutting of the twisted phase difference board so that it is possible to reduce the cost of the liquid crystal display apparatus. The present invention is explained in detail below.

Figure 18:
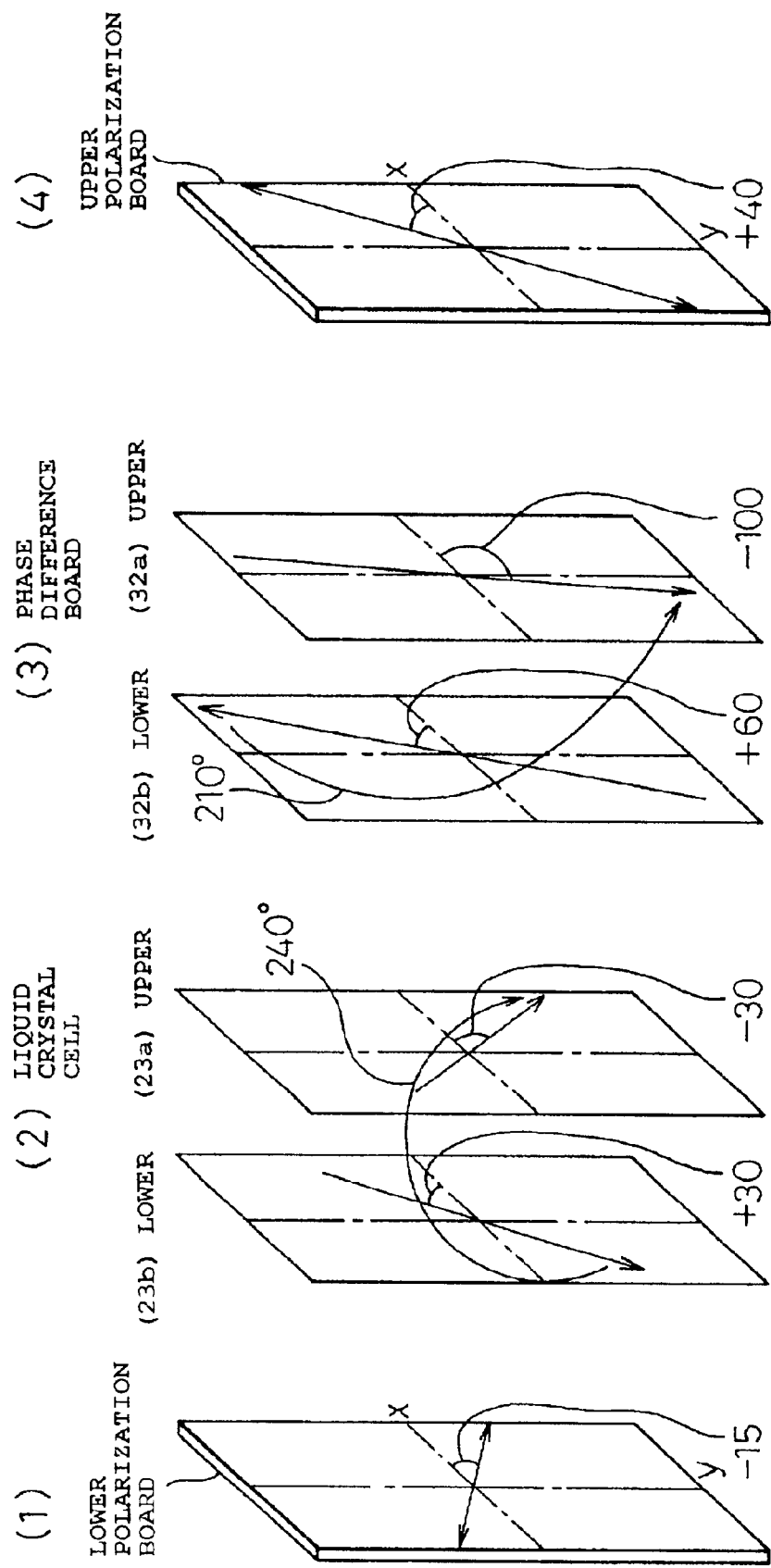
FIG. 18 is an explanatory view for schematically explaining the relationship of the arranged angle which is shown by experiment 7 in FIG. 2.

FIG. 25A shows arrangement relationship between the upper polarization board 4 and the upper polymer 32a shown in FIG. 18. That is, the arrow "a" is the direction of the absorption axis (i.e., a moving direction of the rolled film) of the upper polarization board, and the direction of the arrow "a" has +40° for the x-axis. On the other hand, the arrow "b" the direction of the molecule orientation (i.e., the moving direction of the rolled film), and the direction of the arrow "b" has −100° for the x-axis.

Accordingly, as mentioned above, since the upper polarization board of the rolled film and the twisted phase difference board of the rolled film have the angle relationship between the absorption axis and the oriented direction, they cannot be superposed on each other in the same direction (i.e., roll-out direction). In this case, the upper polymer must be inclined by 140° for the rolled film of the upper polarization board in order to superpose on each other as shown by FIG. 25B. Accordingly, when manufacturing an individual display apparatus, there is considerable loss in the material-cutting when superposing and cutting.

Further, FIG. 25B is a detailed explanatory view of FIG. 25A. The arrangement relationship between the upper polarization board 4 and the upper polymer 32a is the same as that of FIG. 25A. As well as FIG. 25A, the arrow "a" is +40° for the x-axis of the twisted phase difference board, and the arrow "b" is −100° for the x-axis. In this case, as shown by the angles a1 and a2, the upper polymer must be produced based on the oriented direction of ±40° for the moving direction "b" of the rolled film in the manufacture of the twisted phase difference board itself. Accordingly, when the angle relationship between the upper polarization board and the upper polymer is 140°, they must be inclined and superposed on each other as shown in FIG. 25B so that there is considerable loss in material-cutting.

In the present invention, as shown in FIGS. 20 and 21, the angle difference between the absorption axis of the upper polarization board and the molecule-oriented direction of the upper polymer is set to −40°, and the oriented direction of 40° (i.e., angles a1 and a2) of the rolled film of the upper polymer itself is utilized positively so that it is possible to realize the same moving direction of the rolled film of the upper polarization board as that of the rolled film of the twisted phase difference board.

That is, FIG. 25C shows an arrangement relationship between the upper polarization board 4 and the upper polymer 32a in FIG. 20. That is, the arrow "a"indicates the direction of the absorption of the upper polarization board, and has −45° for the x-axis. On the other hand, the arrow "b" indicates the molecule-oriented direction of the upper polymer, and has −85° for the x-axis of the twisted phase difference board. Accordingly, the angle difference between them is 40°. Therefore, when the rolled film of the upper polymer having the oriented direction of 40° is used, the rolled film of the upper polarization board and the rolled film of the upper polymer can be superposed upon each other for the same direction.

Further, FIG. 25D shows an arrangement relationship between the upper polarization board 4 and the upper polymer 32a shown in FIG. 21. That is, the arrow "a" has +90° for the x-axis of the twisted phase difference board, and the arrow "b" has +50° for the x-axis of the twisted phase difference board. Accordingly, the angle difference between them is 40°. Therefore, when the rolled film of the upper polymer having the oriented direction of 40° is used, the rolled film of the upper polarization board and the rolled film of the upper polymer can be superposed upon each other in the same direction. Further, when cutting the rolled film for each size, since it is cut only at a right angles to the rolled film, it is possible to utilize almost all rolled film without loss in material-cutting, and to realize low cost product.

FIG. 26 is an explanatory view in the case of actual manufacture of the rolled films in FIGS. 25C and 25D. As shown in the drawing, the rolled films of the upper polarization board and the upper polymer are moved to the same direction, superposed upon each other and adhered. Then, the superposed rolled film is cut off for each size so that the polarization board with the phase difference board can be manufactured (see dotted line (1)). As another case, the rolled films are superposed upon each other and wound, and cut off it to a suitable size in order to manufacture a bonded unit of the polarization board and the twisted phase difference board. As a result, it is possible to considerably reduce material-cutting loss, and to improve productivity, so that it is possible to achieve reduction in the manufacturing cost.

Figure 27:
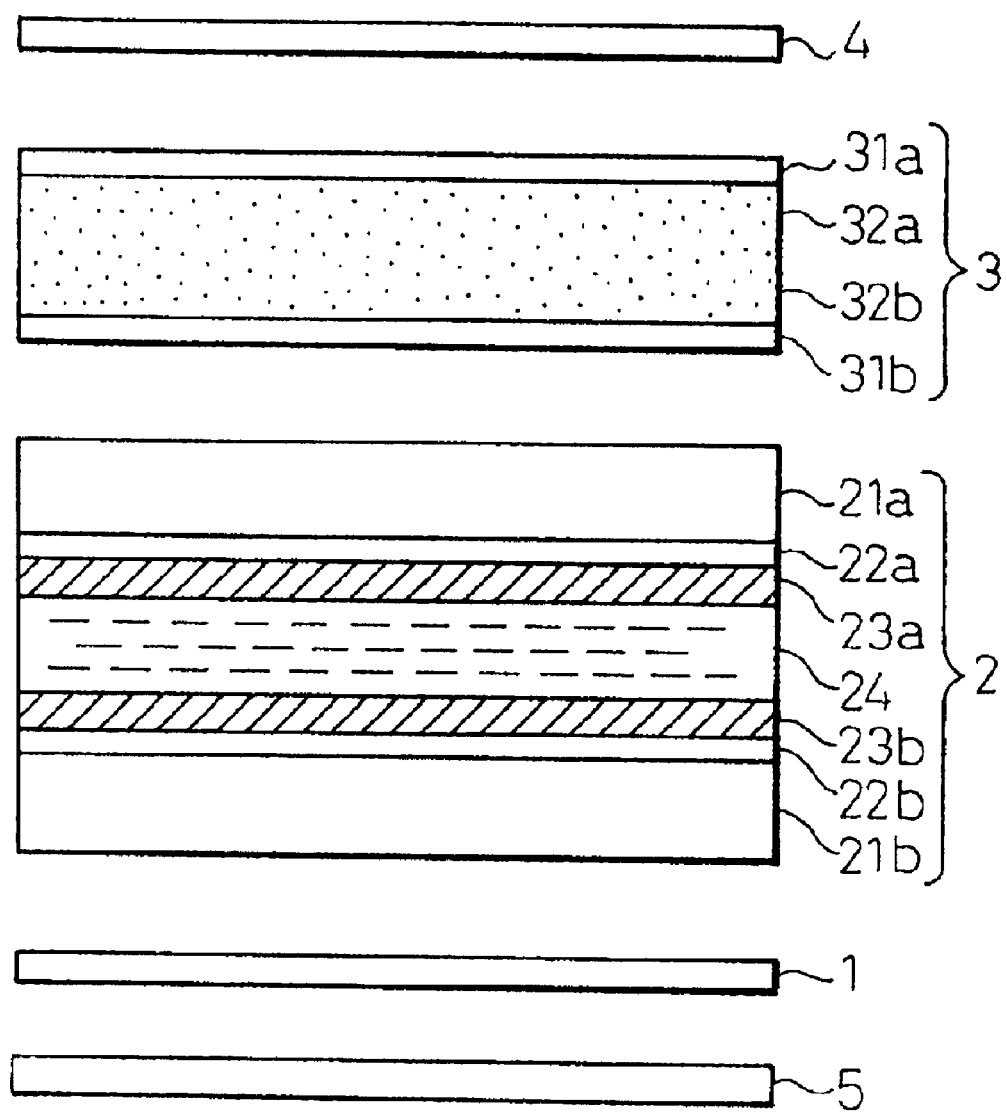
FIG. 27 is an essential structural view in which a reflection board is added to the liquid crystal display apparatus shown in FIG. 1.

FIG. 27 is an essential and structural view of the liquid crystal display apparatus in which a reflection board is added to the structure of FIG. 1. In general, aluminium is evaporated onto a thin substrate, such as a paper, an aluminium foil, etc., and this aluminium-coated substrate is used as the reflection board 5. As another example of the reflection board, a half-transmission type reflection board, in which the aluminium is coated onto a transparent substrate, is used. In this case, a back light (not shown) is usually used in addition to the reflection board.

Figure 28:
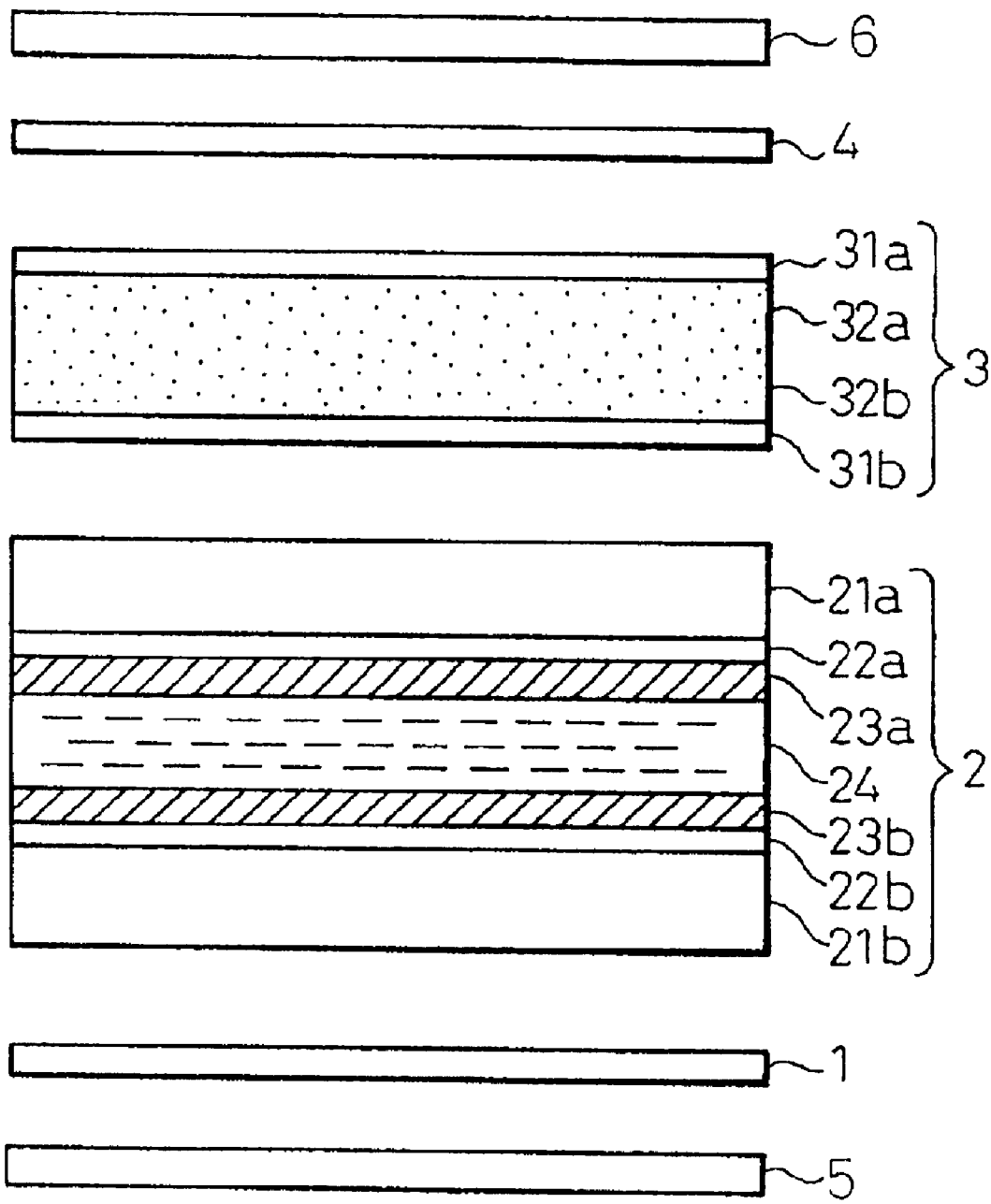
FIG. 28 is an essential structural view in which a touch panel is added to the liquid crystal display apparatus shown in FIG. 1.

FIG. 28 is an essential and structural view of the liquid crystal display apparatus in which a touch panel is added to the structure of FIG. 1. The touch panel 6 is usually bonded to the upper polarization board 4. In the liquid crystal display apparatus according to the present invention, since a high contrast can be realized, it is very easy to observe the image without deterioration of the image quality even if a touch panel 6 is provided.

Figure 29:
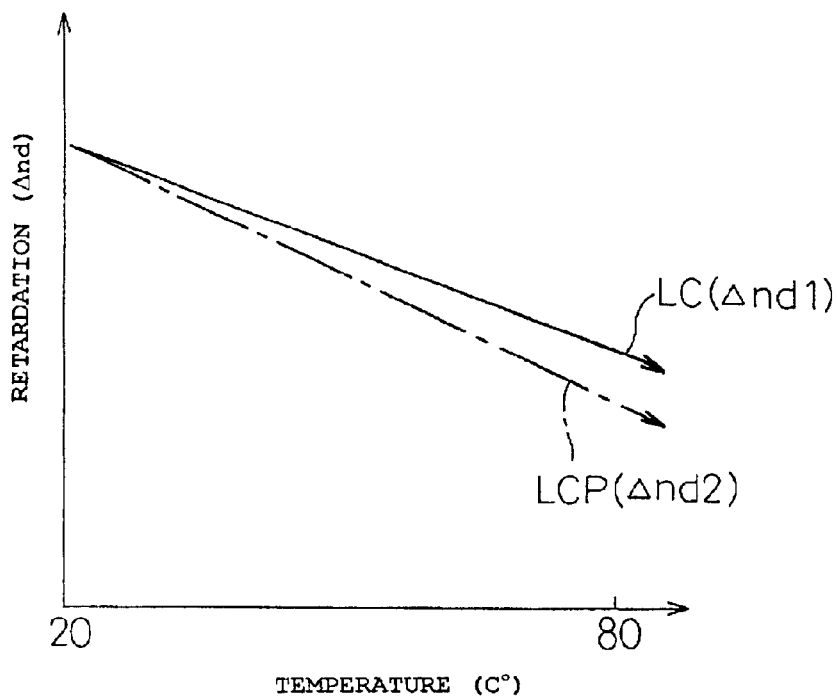
FIG. 29 is a graph for explaining the temperature characteristic of the temperature compensating type liquid crystal polymer layer and the retardation of the nematic liquid crystal layer.

FIG. 29 is a graph for explaining a temperature compensating type liquid crystal polymer used as one modified example and a temperature characteristic of the retardation of the nematic liquid crystal layer. The twisted phase difference board, in which the retardation $\Delta nd2$ is not changed even if the temperature is changed, was used in this embodiment. However, by using the temperature compensating type liquid crystal polymer in which the retardation $\Delta nd2$ becomes small when the temperature raises, it is possible to provide a liquid crystal display apparatus which shows better temperature characteristic. It is obvious that the difference between the retardation $\Delta nd1$ of the nematic liquid crystal layer and the retardation $\Delta nd2$ of the temperature compensating type liquid crystal polymer is constant in the temperature range of 20° C. to 80° C.

In order to resolve an undesirable colored image on the display apparatus and obtain the high contrast, it is desirable to have the same characteristic between two retardations $\Delta nd$ as far as possible. According to the liquid crystal polymer (LCP) used in the present invention, two retardations $\Delta nd$ are matched in this temperature range so that it is possible to realize the image having high quality. In the present invention, the difference between two retardations, i.e., $\Delta nd1 - \Delta nd2$, are defined in the range of 0.1 to 0.3 $\mu$m, and this range is defined when the temperature is 25° C. However, the present invention can be applied in the temperature range of 20° C. to 80° C.

Figure 30:
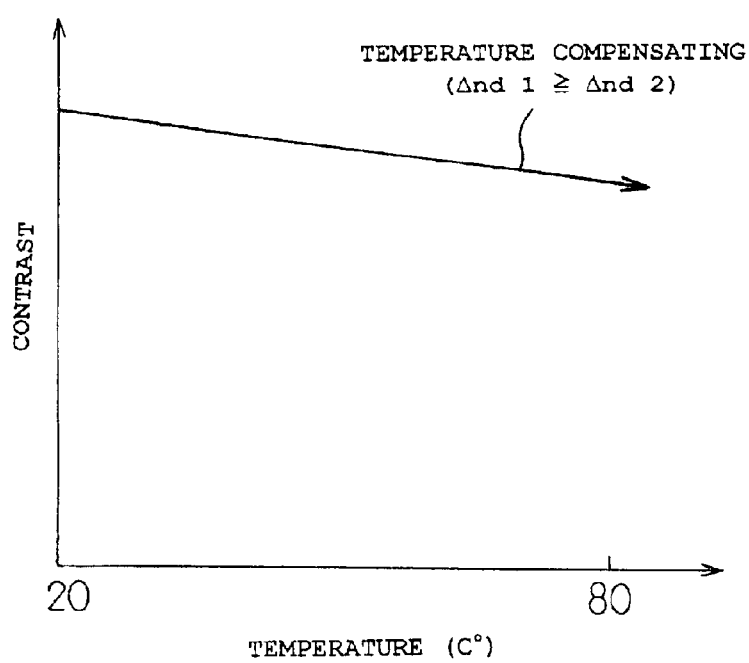
FIG. 30 is a graph for explaining the contrast in use of the liquid crystal polymer layer having the temperature compensation.

FIG. 30 is a graph for explaining the contrast in use of the temperature compensating type liquid crystal polymer. When the temperature compensating type liquid crystal polymer and the liquid crystal cell used in the modified example of the present invention are combined with each other, a deterioration of the contrast is not found as shown in the drawing.

POSSIBILITY OF UTILIZATION IN INDUSTRY

According to the present invention, as mentioned above, based on results of various experiments, the colored image on the display can be resolved by defining concretely various angle relationships, such as relationship between the twist angles, so that it is possible to provide the liquid crystal display apparatus having bright and high contrast. Further, based on the structure of the liquid crystal display apparatus mentioned above, it is possible to perform, very effectively, material-cutting of the structural parts so that it is possible to provide a manufacturing method of the liquid crystal display apparatus in which the reduction of the manufacturing cost and the improvement of the productivity can be realized. As a result, the possibility of utilization in industry is very good in various fields.

In the present invention, the preferential viewing angle of the liquid crystal device by an observer can be any one of the following positions, based upon the convention of the face of a clock: two-thirty, four-thirty, seven-thirty, or ten-thirty o'clock, as shown in FIG. 21(5).

What is claimed is:

1. A liquid crystal display apparatus comprising a liquid crystal device which includes a first substrate having a first transparent electrode a second substrate having a second transparent electrode and a nematic liquid crystal layer which is twisted-oriented by an STN-twist angle between the first and second substrates; a first polarization board provided outside of the first substrate; a twisted phase difference board provided outside of the second substrate and having liquid crystal polymer layers; and a second polarization board provided outside of the twisted phase difference board; wherein:

the direction of the twist angle of molecule orientation of the twisted phase difference board is reverse to the direction of the twisted orientation of the liquid crystal molecule of the liquid crystal devices, and the absolute value of the twist angle of the twisted phase difference board is smaller than the absolute value of the twist angle of the liquid crystal devices by 10° to 40°.

2. A liquid crystal display apparatus as claimed in claim 1, wherein the STN-twist angle lies in the range of 180° to 270°.

3. A liquid crystal display apparatus as claimed in claim 2, wherein an angle between the liquid crystal molecule-oriented direction of the alignment film of the second substrate and the molecule-oriented direction of a lower polymer of the liquid crystal polymer layer lies in the range of 80° to 90°;

an angle between an absorption axis of the first polarization board and the liquid crystal molecule-oriented direction of the alignment film of the first substrate side lies in the range of 50° to 60°; and an angle between the absorption axis of the second polarization board and the molecule-oriented direction of an upper polymer of the liquid crystal polymer lies in the range of 30° to 40°.

4. A liquid crystal display apparatus as claimed in claim 2, wherein in the relationship between a retardation $\Delta nd1$ obtained by product of a double refractive index $\Delta n1$ of the nematic liquid crystal layer and a thickness d1 of the liquid crystal layer, and a retardation $\Delta nd2$ obtained by product of the double refractive index $\Delta n2$ of the liquid crystal polymer layer and the thickness d2 of the liquid crystal polymer layer, the retardation $\Delta nd1$ lies in the range of 0.7 to 0.9 $\mu$m, and the difference $\Delta nd1-\Delta nd2$ lies in the range of 0.1 to 0.3 $\mu$m.

5. A liquid crystal display apparatus as claimed in claim 2, wherein an angle between the liquid crystal molecule-oriented direction of the alignment film of the second substrate and the molecule-oriented direction of a lower polymer of the liquid crystal polymer layer lies in the range of 80° to 90°;

an angle between an absorption axis of the first polarization board and the liquid crystal molecule-oriented direction of the alignment film of the first substrate side lies in the range of 50° to 60°;

an angle between the absorption axis of the second polarization board and the molecule-oriented direction of an upper polymer of the liquid crystal polymer lies in the range of 30° to 40°; and in the relationship between a retardation $\Delta n1$ obtained by product of a double refractive index $\Delta n1$ of the nematic liquid crystal layer and a thickness d1 of the liquid crystal layer, and a retardation $\Delta nd2$ obtained by product of the double refractive index $\Delta n2$ of the liquid crystal polymer layer and the thickness d2 of the liquid crystal polymer layer, the retardation $\Delta nd1$ lies in the range of 0.7 to 0.9 $\mu$m, and the difference $\Delta nd1-\Delta nd2$ lies in the range of 0.1 to 0.3 $\mu$m.

6. A liquid crystal display apparatus as claimed in claim 3 or 5 wherein the second polarization board and the twisted phase difference board structures a bonded unit; and the bonded unit is structured by superposing upon the second polarization board of the rolled film and the twisted phase difference board of the rolled film, and adhering them for the same roll-out direction, by utilizing the angle between the absorption axis of the second polarization board and the molecule-oriented direction of the upper polymer of the liquid crystal polymer layer being in the range of 30° to 40°.

7. A liquid crystal display apparatus as claimed in claim 6, wherein the bonded unit is structured by superposing upon the rolled films each other and adhering them for the same direction, and by cutting it to a predetermined size.

8. A liquid crystal display apparatus as claimed in claim 2, wherein the liquid crystal polymer layer of the twisted phase difference board has a temperature compensating characteristic in a predetermined temperature range.

9. A liquid crystal display apparatus as claimed in claim 8, wherein the liquid crystal polymer layer has a temperature compensating characteristic in which the retardation ($\Delta nd2$) of the liquid crystal polymer layer is always smaller than the retardation ($\Delta nd1$) of the nematic liquid crystal layer in a predetermined temperature range.

10. A liquid crystal display apparatus as claimed in claim 9, wherein the predetermined temperature range lies in the range of 20° to 80°.

11. A liquid crystal display apparatus as claimed in claim 2, wherein a viewing angle of the liquid crystal apparatus by an observer can be at any one of the following positions, based upon the convention of a clock-face: one-thirty, four-thirty, seven-thirty, or ten-thirty o'clock.

12. A liquid crystal display apparatus comprising a first substrate having a first transparent electrode and a second substrate having a second transparent electrode, a liquid crystal device holding a nematic liquid crystal layer which is twist-oriented by an STN-twist angle in the range of 180° to 270° between the first and second substrates; a first polarization board provided outside of the first substrate; a twisted phase difference board provided outside of the second substrate and having liquid crystal polymer layers; and a second polarization board provided outside of the twisted phase difference board;

a) the direction of the twist angle of molecule orientation of the twisted phase difference board is reverse to the direction of the twisted orientation of the liquid crystal molecule of the liquid crystal device, and the absolute value of twist angle of the twisted phase difference board smaller than the absolute twist angle of the liquid crystal devices by a range 10° to 40°;

b) an angle between the liquid crystal molecule-oriented direction of the alignment film of the second substrate and the molecule-oriented direction of a lower polymer of the liquid crystal polymer layer lies in the range of 80° to 90°;

c) an angle between an absorption axis of the first polarization board and the liquid crystal molecule-oriented direction of the alignment film of the first substrate side lies in the range of 50° to 60°;

d) an angle between the absorption axis of the second polarization board and the molecule-oriented direction of an upper polymer of the liquid crystal polymer lies in the range of 30° to 40°;

e) in the relationship between a retardation $\Delta nd1$ obtained by product of a double refractive index $\Delta n1$ of the nematic liquid crystal layer and a thickness d1 of the liquid crystal layer, and a retardation $\Delta nd2$ obtained by product of the double refractive index $\Delta n2$ of the liquid crystal polymer layer and the thickness d2 of the liquid crystal polymer layer, $\Delta nd1$ lies in the range of 0.7 to 0.9 $\mu$m, and the difference $\Delta nd1-\Delta nd2$ lies in the range of 0.1 to 0.3 $\mu$m;

f) the second polarization board and the twisted phase difference board structure a bonded unit; and the bonded unit is structured by superposing upon the second polarization board of the rolled film and the twisted phase difference board of the rolled film, adhering them for the same roll-out direction, and cutting it to a predetermined size; and g) the liquid crystal polymer layer has a temperature compensating characteristic in which the retardation ($\Delta nd2$) of the liquid crystal polymer layer is always smaller than the retardation ($\Delta nd1$) of the nematic liquid crystal layer in a predetermined temperature range.

13. A method for manufacturing a liquid crystal display apparatus comprising a first substrate having a first transparent electrode and a second substrate having a second transparent electrode, a liquid crystal device holding a nematic liquid crystal layer which is twist-oriented by an STN-twist angle in the range of 180° to 270° between the first and second substrates; a first polarization board provided outside of the first substrate; a twisted phase difference board provided outside of the second substrate and having liquid crystal polymer layers; and a second polarization board provided for the outside of the twisted phase difference board; wherein an angle between an absorption axis of the second polarization board and a molecule-oriented direction of an upper polymer of the liquid crystal polymer layer lies in the range of 30° to 40°; wherein:

a) the second polarization board is structured by rolled film;

b) the twisted phase difference board is structured by rolled film;

c) the roll-out direction of the rolled film of the second polarization board and the roll-out direction of the rolled film of the twisted phase difference board are arranged in the same direction by utilizing an angle in the range of 30° to 40°;

d) the rolled film of the second polarization board and the rolled film of the twisted phase difference board are superposed upon each other and adhered in the roll-out direction; and e) a bonding unit is made by cutting the rolled film in a predetermined size after adhesion and bonding the second polarization board and the twisted phase difference board.

* * * * *

UNITED STATES PATENT AND TRADEMARK OFFICE
CERTIFICATE OF CORRECTION

PATENT NO. : 6,853,437 B1  Page 1 of 1
APPLICATION NO. : 09/530008
DATED : February 8, 2005
INVENTOR(S) : Yasushi Kaneko et al.

It is certified that error appears in the above-identified patent and that said Letters Patent is hereby corrected as shown below:

claim 1, column 12, line 42, "electrode a" should read --electrode, a--.

claim 5, column 13, line 35, "retardation $\Delta n1$" should read --retardation $\Delta nd1$--.

claim 6, column 13, line 45, "3 or 5 wherein" should read --3 or 5, wherein--.

claim 12, column 14, line 24, "of twist" should read --of the twist--.

claim 12, column 14, line 25, "board smaller than the absolute twist" should read --board is smaller than the absolute value of the twist--.

claim 12, column 14, line 26, "devices by a range 10°" should read --device by a range of 10°--.

Signed and Sealed this

Twenty-fifth Day of December, 2007

JON W. DUDAS
*Director of the United States Patent and Trademark Office*